(12) United States Patent
Li et al.

(10) Patent No.: US 12,517,279 B2
(45) Date of Patent: Jan. 6, 2026

(54) METHOD AND SYSTEM FOR SITING HEAT WAVE MONITORING STATIONS BASED ON RISK EVALUATION

(71) Applicant: South China University of Technology, Guangdong (CN)

(72) Inventors: Qiong Li, Guangdong (CN); Huiwang Peng, Guangdong (CN); Qinrong Yang, Guangdong (CN); Haotian Wu, Guangdong (CN); Qi Li, Guangdong (CN); Qinglin Meng, Guangdong (CN)

(73) Assignee: South China University of Technology, Guangdong (CN)

( * ) Notice: Subject to any disclaimer, the term of this patent is extended or adjusted under 35 U.S.C. 154(b) by 0 days.

(21) Appl. No.: 18/677,981

(22) Filed: May 30, 2024

(65) Prior Publication Data
US 2024/0402386 A1 Dec. 5, 2024

(30) Foreign Application Priority Data
May 31, 2023 (CN) .......................... 202310633063.X

(51) Int. Cl.
*G01W 1/02* (2006.01)
*G06F 18/26* (2023.01)
*G06Q 10/0631* (2023.01)

(52) U.S. Cl.
CPC .............. *G01W 1/02* (2013.01); *G06F 18/26* (2023.01); *G06Q 10/06313* (2013.01); *G01W 2201/00* (2013.01)

(58) Field of Classification Search
CPC ..... G01W 1/02; G01W 2201/00; G06F 18/26; G06Q 10/06313
See application file for complete search history.

(56) References Cited

U.S. PATENT DOCUMENTS

| 7,324,193 | B2 * | 1/2008 | Lally ....................... H01L 22/12 |
| | | | 700/121 |
| 9,129,219 | B1 * | 9/2015 | Robertson ................ G06N 5/04 |
| 9,274,251 | B2 * | 3/2016 | Pasken .................... G01W 1/10 |
| 10,579,925 | B2 * | 3/2020 | Kasabov ................ G06N 3/088 |
| 10,751,125 | B2 * | 8/2020 | Levy ....................... A61B 34/10 |
| 10,949,924 | B2 * | 3/2021 | Reimann .................. G06N 7/01 |

(Continued)

*Primary Examiner* — Tung S Lau
(74) *Attorney, Agent, or Firm* — Cooper Legal Group, LLC

(57) ABSTRACT

Disclosed is a method for siting heat wave monitoring stations based on risk evaluation, including: acquiring historical meteorological data of a target region, and preprocessing the historical meteorological data to generate a gridded associated meteorological data set; identifying historical high-temperature heat wave events based on the associated meteorological data set, and calculating parameters and summary indexes of heat wave feature of grids; evaluating station building priority of the grids based on spatial distribution features of the summary indexes; acquiring multi-source data, and evaluating a heat wave risk to generate a heat wave risk map; performing iterative computation using an optimization algorithm based on current station building information, temporal-spatial distribution features of meteorological factors and the heat wave risk map to determine alternative station building positions; and acquiring on-site survey information of each alternative station building position, and determining a position where a station is to be built.

2 Claims, 8 Drawing Sheets

(56) References Cited

U.S. PATENT DOCUMENTS

| | | | | |
|---|---|---|---|---|
| 11,169,678 | B2* | 11/2021 | Tohidi | G06F 3/04847 |
| 11,379,274 | B2* | 7/2022 | Chongfuangprinya | ...................... G06F 9/542 |
| 12,005,281 | B2* | 6/2024 | Tohidi | G06N 20/10 |
| 2009/0059240 | A1* | 3/2009 | Hartig | G01B 1/0625 356/636 |
| 2010/0191113 | A1* | 7/2010 | Hazard | A61B 8/08 600/443 |
| 2017/0132537 | A1* | 5/2017 | Chavez | G06Q 40/06 |
| 2017/0357920 | A1* | 12/2017 | Stewart | G01W 1/10 |
| 2018/0114272 | A1* | 4/2018 | Reimann | G06N 7/01 |
| 2020/0083074 | A1* | 3/2020 | Clark | H01L 21/67161 |
| 2022/0252988 | A1* | 8/2022 | Werkman | G03F 7/70508 |

* cited by examiner acquiring historical meteorological data of a target region, and preprocessing the historical meteorological data according to a spatial distribution and a time sequence to generate a gridded associated meteorological data set — S10 identifying historical high-temperature heat wave events based on the associated meteorological data set, and calculating parameters and summary indexes of heat wave features for each of grids based on occurrence times and daily heat wave magnitudes of the historical high-temperature heat wave events;

determining a daily high-temperature data set $A_d = \bigcup_{y_1}^{y_n} \bigcup_{i=d-15}^{d+15} T_{yj}$ of each of the grids based on the gridded associated meteorological data set;

calculating a daily heat wave magnitude $M_d$ of each of the grids based on the gridded associated meteorological data set and the sensible temperature $AT_d$, wherein $$M_d = \begin{cases} \dfrac{T_d - T_{y25p}}{T_{y75p} - T_{y25p}}, & \text{if } T_d > T_{y25p} \text{ and } T_d \geq AT_d \\ \dfrac{AT_d - T_{y25p}}{T_{y75p} - T_{y25p}}, & \text{if } T_d > T_{y25p} \text{ and } T_d < AT_d \\ 0, & \text{if } T_d \leq T_{y25p} \end{cases}$$

— S20 evaluating a priority of building a heat wave monitoring station in each of the grids based on spatial distribution features of the summary indexes of heat wave features in the target region — S30 acquiring multi-source data of each of the grids in the target region, and evaluating a heat wave risk of each of the grids to generate a heat wave risk map — S40 performing an iterative computation with an optimization algorithm based on current station building information, temporal-spatial distribution features of meteorological factors and the heat wave risk map, to determine information of alternative station building positions. Specifically, setting objective functions: $max \bigcup_{i=1}^{n} A_i$ and $min\ (n_H + n_M + n_L)$, as well as constraint functions: $D_{ij} \leq D_{max}, \sum_n A_{H\_i} \geq 0.95 A_H, n_H:n_M \geq 3$ and $n_H:n_L \geq 3$; — S50 acquiring on-site survey information of each of the alternative station building positions, and determining information of a position where a station is to be built — S60

Fig. 1

METHOD AND SYSTEM FOR SITING HEAT WAVE MONITORING STATIONS BASED ON RISK EVALUATION

CROSS-REFERENCE TO RELATED APPLICATION

This application claims the priority and benefit of Chinese patent application No. 202310633063.X, filed on May 31, 2023. The entirety of Chinese patent application No. 202310633063.X is hereby incorporated by reference herein and made a part of this specification.

FIELD OF THE INVENTION

The present application relates to the field of meteorological environment monitoring technologies, and in particular, to a heat-wave-monitoring-station site selection method and system based on risk evaluation.

BACKGROUND OF THE INVENTION

A high-temperature heat wave event refers to long-time abnormal high-temperature weather, and may not only obviously increase the incidence rates of some diseases, but also cause influences, such as industrial and agricultural yield reduction, energy shortage, urban infrastructure damage, or the like. For the definition of the high-temperature heat wave event, no unified standard exists internationally; currently, the situation that highest temperatures in continuous 3 days are higher than or equal to 35° C. is generally used as a judgment standard for the high-temperature heat wave event in most countries including China; meanwhile, a current high-temperature heat wave early warning system mainly depends on temperatures of weather forecast, such that an existing high-temperature heat wave early warning method ignores influences of a heat stress adaptability difference of different regions and meteorological factors except the temperatures, which tends to cause missed and false reports of the high-temperature heat wave event. Therefore, building of a sufficient number of heat wave monitoring stations is of great significance for monitoring and early warning of the high-temperature heat wave event.

Currently, the number of the heat wave monitoring stations in China is seriously insufficient, and spatial distribution is extremely unbalanced; meanwhile, site selection is mainly performed manually, such that the efficiency is low, verification of the space representativeness is neglected, and actual requirements are difficult to meet.

In view of the above current situation, the inventor believes that currently, the inefficient and unscientific site selection of the heat wave monitoring station is urgently required to be solved.

SUMMARY

In order to improve the efficiency and scientificity of site selection of a heat wave monitoring station, the present application provides a method and system for siting heat wave monitoring stations based on risk evaluation.

A first purpose of the present application is achieved by adopting the following technical solution.

A method for siting heat wave monitoring stations based on risk evaluation includes:
acquiring historical meteorological data of a target region, and preprocessing the historical meteorological data according to spatial distribution and a time sequence to generate a gridded associated meteorological data set;
identifying historical high-temperature heat wave events based on the associated meteorological data set, and calculating heat wave feature parameters and summary indexes thereof of grids based on occurrence times and daily heat wave magnitudes of the high-temperature heat wave events;
evaluating a priority of building a heat wave monitoring station in each of the grids based on spatial distribution features of the summary indexes of heat wave features in the target region;
acquiring multi-source data of each of the grids in the target region, and evaluating a heat wave risk of each of the grids to generate a heat wave risk map;
performing iterative computation using an optimization algorithm based on current station building information, temporal-spatial distribution features of meteorological factors and the heat wave risk map, so as to determine information of alternative station building positions; and
acquiring on-site survey information of each alternative station building position, and determining information of a position where a station is to be built.

By adopting the above technical solution, the historical meteorological data of the target region is obtained, associated meteorological data is screened out from the historical meteorological data to reduce the storage amount and the processing amount of the data, and the historical meteorological data is preprocessed according to spatial distribution and a sampling time to generate the gridded associated meteorological data set; historical associated meteorological data conditions are analyzed based on the associated meteorological data set, such that the times and the daily heat wave magnitudes of the high-temperature heat wave events occurring in the target region historically are determined, so as to further analyze and determine the heat wave feature parameters and the summary indexes thereof of the grids; based on a temporal distribution rule and the spatial distribution feature of the summary index of each heat wave feature in the target region, the priority for building the heat wave monitoring station in each of the grids is determined, and then, the station building priority corresponding to each of the grids is determined; the multi-source data of each of the grids in the target region is acquired, and a harmfulness index, an exposure index and a vulnerability index of each of the grids are analyzed, so as to comprehensively evaluate the risk of an influence of the high-temperature heat wave event on each of the grids, thereby generating the heat wave risk map, facilitating subsequent assistance in the site selection of the heat wave monitoring station according to the heat wave risk map, and improving the scientificity of the site selection of the heat wave monitoring station; information of a heat wave monitoring station and a meteorological monitoring station which are present or planned to be built in the target region is determined based on the current station building information, and the iterative computation is further performed using the optimization algorithm according to the temporal-spatial distribution features of the meteorological factors and the heat wave risk map, so as to determine the information of alternative station building positions; the on-site survey information of each alternative station building position is acquired, and after the information of alternative station building positions is adjusted, the information of the position where the station is to be built is determined, thereby improving the efficiency and scientificity of the site selection of the heat wave monitoring station.

In a preferred example of the present application, the step of acquiring gridded historical meteorological data of a target region, and preprocessing the historical meteorological data according to spatial distribution and a time sequence to generate an associated meteorological data set includes:

acquiring the historical meteorological data of the target region, the meteorological factors of the historical meteorological data including an air temperature, a relative humidity and an average wind speed, and the historical meteorological data including a plurality of authoritative meteorological data sets;

preprocessing the gridded historical meteorological data according to the spatial distribution and the time sequence, the data preprocessing including data format conversion, abnormal value elimination and missing value filling; and acquiring a daily highest temperature of each of the grids in the target region, as well as humidity data and wind speed data corresponding to the daily highest temperature from the historical meteorological data to generate the associated meteorological data set.

By adopting the above technical solution, the data preprocessing is performed in combination with the plurality of authoritative meteorological data sets of the target region to determine the data, such as the air temperature, the relative humidity, the average wind speed, or the like, of each of the grids, and the associated meteorological data set is generated, thereby improving the data quality and data integrity, and solving the problems of poor data quality, low observation precision and incomplete meteorological factors in similar research.

In a preferred example of the present application, the step of identifying historical high-temperature heat wave events based on the associated meteorological data set, and calculating heat wave feature parameters of grids based on occurrence times and daily heat wave magnitudes of the historical high-temperature heat wave events includes:

determining a daily high-temperature data set $A_d = U_{ys}^{ye} U_{i=d-15}^{d+15} T_{y,j}$ of each of the grids based on the associated meteorological data sets, defining an Nth percentile in the daily high-temperature data set $A_d$ as a high-temperature threshold, defining a day with the daily highest temperature greater than the high-temperature threshold as a high-temperature day, and defining three continuous high-temperature days as the high-temperature heat wave event;

calculating a sensible temperature $AT_d = 1.07\,T_d + 0.2e - 0.65V - 2.7$ of each of the grids based on the associated meteorological data set, wherein $$e = \frac{RH}{100} \times 6.105 \times \exp\frac{17.27T}{237.7+T};$$

calculating the daily heat wave magnitude $M_d$ of each of the grids based on the associated meteorological data set and the sensible temperature $AT_d$, wherein $$M_d = \begin{cases} \dfrac{T_d - T_{y25p}}{T_{y75p} - T_{y25p}}, & \text{if } T_d > T_{y25p} \text{ and } T_d \geq AT_d \\ \dfrac{AT_d - T_{y25p}}{T_{y75p} - T_{y25p}}, & \text{if } T_d > T_{y25p} \text{ and } T_d < AT_d; \\ 0, & \text{if } T_d \leq T_{y25p} \end{cases}$$

calculating an average heat wave magnitude, a heat wave days and a heat wave frequency corresponding to each of the grids based on the occurrence time and the daily heat wave magnitude of the high-temperature heat wave event of each of the grids in a reference period, so as to generate the heat wave feature parameters;

wherein $U_{ys}^{ye}$ is a set of daily highest temperature data in the reference period (years ys to ye), d is a selected target date, $U_{i=d-15}^{d+15}$ is a set of daily highest temperature data in a window period of 15 days before and after the date d, and $T_{y,j}$ is a daily highest temperature of the jth day of the year y; $T_d$ is the daily highest temperature of the date d, $AT_d$ is a highest sensible temperature of the date d, e is a water vapor pressure, V is the wind speed, RH is the relative humidity, $T_{y25p}$ and $T_{y75p}$ are a 25th percentile and a 75th percentile of annual highest temperatures of the years ys to ye respectively; the average heat wave magnitude is an average value of daily heat wave magnitudes in one statistical period, the heat wave days is a number of days of the high-temperature heat wave events in one statistical period, and the heat wave frequency is a number of the high-temperature heat wave events in one statistical period.

By adopting the above technical solution, since persons in different regions have different tolerance degrees for high-temperature weather, for judgment of the high-temperature heat wave event, compared with a currently common absolute threshold method (that is, the situation that daily highest temperatures in continuous three days are higher than or equal to 35° C. is used as a judgment standard for the high-temperature heat wave event), in the present application, influences of local historical climate of each of the grids are considered, so as to more scientifically and reasonably identify the high-temperature heat wave event; the heat wave magnitude is calculated through a larger value between the daily highest temperature and the daily highest sensible temperature, such that influences of the factors of the temperature, the humidity and the wind speed on a human body are considered comprehensively when the severity of the high-temperature heat wave event is evaluated, the solution is more scientific compared with a solution in which only the temperature factor is considered, underestimation of damage of a high temperature and a high humidity in the traditional method is made up, and damage of the heat wave event on health of the human body can be reflected better; and the heat wave feature parameters in the reference period are calculated using the occurrence time and the daily heat wave magnitude of the identified high-temperature heat wave event, so as to subsequently analyze a feature change trend of the high-temperature heat wave event of each of the grids.

In a preferred example of the present application, after the step of calculating an average heat wave magnitude, a heat wave days and a heat wave frequency corresponding to each of the grids based on the event parameters of each of the grids in the statistical period, so as to generate the heat wave feature parameters, the method includes:

preprocessing each heat wave feature parameter according to spatial distribution and a time sequence to generate a heat wave feature data set, and performing whitening preprocessing on the heat wave feature data set to eliminate autocorrelation of the heat wave feature data set;

obtaining a trend degree of the heat wave frequency using a Mann-Kendall test method and a Sen slope estimation method;

performing abrupt change detection on the heat wave features using the Mann-Kendall test method and a sliding T test method, so as to determine an abrupt change point and a corresponding abrupt change time point; and taking a subsequence after the abrupt change time point as a stable phase, and averaging the average heat wave magnitudes and the heat wave days in the stable phase to obtain an annual average heat wave magnitude and annual average heat wave days of each of the grids in the stable phase respectively.

By adopting the above technical solution, a change trend of the heat wave frequency is analyzed, the data in the heat wave feature data set is not required to accord with any specific distribution, and the problem that a traditional linear regression method is easily influenced by abnormal values during estimation of a linear trend of a time sequence is solved; a climate abrupt change is an important phenomenon commonly existing in a climate system, and the heat wave feature abrupt change point and the corresponding time of the target region are detected using the Mann-Kendall test method and the sliding T test method, such that the accuracy of a subsequent analysis result of the change trend of the high-temperature heat wave event of the target region can be improved, the heat wave trends of different regions can be further compared, whether the heat wave feature of a concerned region has an obvious abrupt change point or not can be determined, and if the abrupt change point exists, a time after the abrupt change point is taken as the stable phase; and the heat wave feature parameters before the abrupt change time point are eliminated, and the summary index of the heat wave features is calculated for following analysis, so as to improve the scientificity of calculation.

In a preferred example of the present application, the step of obtaining a trend degree of the heat wave frequency using a Mann-Kendall test method and a Sen slope estimation method includes:

testing the heat wave feature data set using the Mann-Kendall test method, and calculating corresponding S statistics, variances Var(S) of the S statistics and ZS scores according to the time sequences of the heat wave feature parameters one by one, wherein $$S = \sum_{k=1}^{n-1} \sum_{j=k+1}^{n} \text{sgn}(x_j - x_k),$$

$$ZS = \begin{cases} \dfrac{S-1}{\sqrt{\text{Var}(S)}}; & S > 0 \\ 0; & S = 0 \\ \dfrac{S+1}{\sqrt{\text{Var}(S)}}; & S < 0 \end{cases},$$

$$\text{Var}(S) = \dfrac{n(n-1)(2n+5) - \sum_{k=1}^{n} t_k k(k-1)(2k+5)}{18};$$

calculating a variation amplitude of a time sequence of the heat wave frequency in the reference period using the Sen slope estimation method as the trend degree of the heat wave frequency;

wherein n is a number of the time sequences x, and $x_j$ and $x_k$ are values of the time sequence x at k and j (j>k).

In a preferred example of the present application, the step of performing abrupt change detection on the heat wave features using the Mann-Kendall test method and a sliding T test method, so as to determine an abrupt change point and a corresponding abrupt change time point includes:

testing the heat wave feature data set using the Mann-Kendall test method, detecting the abrupt change according to the time sequence of the heat wave features, and when curve $UB_k$ and curve $UF_k$ have an intersection point and the intersection point is within a confidence level, marking the intersection point as the abrupt change point, and determining the corresponding abrupt change time point; and performing a sliding T test on the abrupt change point, calculating average values of subsequences before and after the abrupt change point, and verifying rationality of the abrupt change point by judging whether a difference of the average values of the subsequences before and after the abrupt change point is obvious or not.

In a preferred example of the present application, the summary index based on the heat wave features of each of the grids in the reference period includes the annual average heat wave magnitude, the annual average heat wave days and the trend degree of the heat wave frequency corresponding to each of the grids. The trend analysis and abrupt change point test are performed on the time sequence of the heat wave frequency in the reference period to obtain the trend degree of the heat wave frequency and the abrupt change time point, the subsequence after the abrupt change time point is defined as the stable phase, and the average heat wave magnitudes and the heat wave days in the stable phase are averaged with a natural year as the statistical period, so as to obtain the annual average heat wave magnitude and the annual average heat wave days respectively.

In a preferred example of the present application, the step of evaluating a priority of building a heat wave monitoring station in each of the grids based on spatial distribution features of the summary indexes of heat wave features in the target region includes:

determining an annual average heat wave magnitude grade, an annual average heat wave days grade and an annual average heat wave frequency trend degree grade of each of the grids using a natural breakpoint method based on a heat wave intensity map, a heat wave days map and a heat wave frequency trend degree map;

setting weights of the annual average heat wave magnitude, the annual average heat wave days and the trend degree of the heat wave frequency respectively, the weight of the annual average heat wave days being larger than the weight of the annual average heat wave magnitude which is larger than the weight of the trend degree of the heat wave frequency; and calculating the station building priority of each of the grids based on the annual average heat wave magnitude grade, the annual average heat wave days grade, the heat wave frequency trend degree grade as well as the weights of the annual average heat wave magnitude, the annual average heat wave days and the trend degree of the heat wave frequency of each of the grids, so as to generate a building priority map.

By adopting the above technical solution, based on the spatial distribution features of the summary indexes of the heat wave features after the abrupt change time point in the target region, the heat wave intensity map, the heat wave days map and the heat wave frequency trend degree map are created, so as to learn the spatial distribution features of the heat wave feature parameters in the specific statistical period of the target region, and determine the annual average heat wave magnitude grade, the annual average heat wave days grade and the heat wave frequency trend degree grade of each of the grids; according to analysis requirements, the weights of the annual average heat wave magnitude, the annual average heat wave days and the trend degree of the heat wave frequency can be set; and the station building priority of each of the grids is determined by means of weighting calculation, and the building priority map is generated based on the station building priority of each of the grids, so as to realize allocation of building resources of the heat wave monitoring station.

In a preferred example of the present application, the step of acquiring multi-source data of each of the grids in the target region, and evaluating a heat wave risk of each of the grids to generate a heat wave risk map includes:
  acquiring the multi-source data of each of the grids, and performing format conversion, abnormal value elimination and missing value filling on the multi-source data;
  based on the building priority map, analyzing a probability, intensity and duration of the high-temperature heat wave event of each of the grids to evaluate the harmfulness index of each of the grids by the high-temperature heat wave event;
  analyzing population and land utilization data of each of the grids based on the multi-source data to evaluate the exposure index for an influence of the high-temperature heat wave event;
  analyzing population data, resource data, environmental data and economic development data of each of the grids based on the multi-source data to evaluate the vulnerability index for the influence of the high-temperature heat wave event; and
  performing weighted average calculation based on the harmfulness index, the exposure index and the vulnerability index of each of the grids to generate a heat wave risk grade of each of the grids, so as to create the heat wave risk map.

By adopting the above technical solution, the multi-source data of each of the grids is obtained, and format conversion, abnormal value elimination and missing value filling are performed, so as to analyze the multi-source data subsequently; the probability, the intensity and the duration of the high-temperature heat wave event of each of the grids are analyzed based on the building priority map, and the harmfulness index of each of the grids by the high-temperature heat wave event is evaluated based on the associated meteorological data set, so as to evaluate a degree of threat of the long-term high-temperature heat wave event to a crowd and the environment; the population and land utilization data of each of the grids are analyzed based on the multi-source data to evaluate the exposure index in each of the grids for the influence of the high-temperature heat wave event; the vulnerability index of each exposure factor for the influence of the high-temperature heat wave event is further evaluated; and the weighted average calculation is performed based on the harmfulness index, the exposure index and the vulnerability index of each of the grids to generate the heat wave risk grade, and the heat wave risk grade of each of the grids is marked on the corresponding grid to create the heat wave risk map, so as to determine the risks of the influences of the high-temperature heat wave event on different grids.

In a preferred example of the present application, the heat wave risk grade includes a high risk, a medium risk and a low risk, and the step of performing iterative computation using an optimization algorithm based on current station building information, temporal-spatial distribution features of meteorological factors and the heat wave risk map, so as to determine information of alternative station building positions includes:
  acquiring the current station building information, and determining position information and service range information of an initial monitoring station;
  determining a service radius of a heat wave monitoring station to be built in the target region based on a semivariable function fitting result of different meteorological factors;
  setting objective functions: max $U_{i=1}^{n} A_i$ and min ($n_H + n_M + n_L$), as well as constraint functions: $D_{ij} \leq D_{max}$, $\Sigma_n A_{H\_i} \geq 0.95 A_H$, $n_H : n_M \geq 3$ and $n_H : n_L \geq 3$; and
  based on the optimization algorithm, performing iteration to obtain an approximate optimal solution, and determining the information of alternative station building positions;
  wherein $A_i$ is a service area of an ith station; $n_H$, $n_M$ and $n_L$ are numbers of the heat wave monitoring stations to be built at the high risk, the medium risk and the low risk respectively, $D_{ij}$ is a distance between the i-th station and a j-th station, $D_{max}$ is the service radius of the heat wave monitoring station to be built, $A_{H\_i}$ is an area of a high risk region covered by the ith station, and $A_H$ is a total area of high risk regions in the target region.

By adopting the above technical solution, the current station building information is obtained, and the position information and the service range information of the initial monitoring station are determined; the service radius of the heat wave monitoring station in the region is calculated based on the semivariable function fitting result of different meteorological factors, such that the number and the positions of the heat wave monitoring stations can be conveniently and reasonably planned subsequently; with a spatial clustering algorithm as an initial step and in combination with service radius information, solving is performed by using the optimization algorithm; an alternative station building position solution of the heat wave monitoring station obtained using the two steps not only has strong space representativeness, but also can be combined with the service radii of the heat wave monitoring stations to reduce the number of the to-be-built heat wave monitoring stations to the highest extent under the condition of meeting the spatial distribution uniformity.

A second purpose of the present application is achieved by adopting the following technical solution.

A system for siting heat wave monitoring stations based on risk evaluation includes:
  a meteorological data processing module configured to acquire historical meteorological data of a target region, and preprocess the historical meteorological data according to spatial distribution and a time sequence to generate a gridded associated meteorological data set;
  a heat wave feature analyzing module configured to identify historical high-temperature heat wave events based on the associated meteorological data set, and calculate heat wave feature parameters and summary indexes thereof of grids based on occurrence times and daily heat wave magnitudes of the high-temperature heat wave events;
  a station building priority evaluating module configured to evaluate a priority of building a heat wave monitoring station in each of the grids based on spatial distribution features of the summary indexes of heat wave features in the target region;
  a heat wave risk evaluating module configured to acquire multi-source data of each of the grids in the target region, and evaluate a heat wave risk of each of the grids to generate a heat wave risk map;
  a station building position analyzing module configured to perform iterative computation using an optimization algorithm based on current station building information, temporal-spatial distribution features of meteorological factors and the heat wave risk map, so as to determine information of alternative station building positions; and a station building position adjusting module configured to acquire on-site survey information of each alternative station building position, and determine information of a position where a station is to be built.

A third purpose of the present application is achieved by adopting the following technical solution.

A computer device includes a memory, a processor and a computer program stored in the memory and executable on the processor, wherein the processor implements the steps of the method for siting heat wave monitoring stations based on risk evaluation when executing the computer program.

A fourth purpose of the present application is achieved by adopting the following technical solution.

A computer-readable storage medium stores a computer program which, when executed by a processor, implements the steps of the method for siting heat wave monitoring stations based on risk evaluation.

In summary, the present application has at least one of the following beneficial effects.

1. A complete heat wave prediction system can be established conveniently: the heat wave monitoring stations are strategically arranged using a data-driven method, and a traditional numerical simulation method is combined, such that the high-temperature heat wave event can be more accurately, more timely and more reliably found and predicted.

2. A scientific heat wave early warning system can be established conveniently: compared with a traditional single-factor static risk map, in the method, the multi-factor real-time dynamic heat wave risk map is drawn by monitoring the temperature, humidity and wind speed factors in real time, and more scientific heat wave early warning can be provided.

3. The station building cost is lower, and the efficiency is higher: according to the solution, the high risk region is considered preferentially, and the spatial features of the meteorological factors are considered, such that the alternative station building position can be screened out quickly; the same effect as a traditional method is achieved by fewer heat wave monitoring stations, thereby obviously saving the mounting and maintenance costs.

4. The method has a wide application range and can give consideration to future scenarios: the method is not only suitable for the whole country, but also can comprehensively consider future meteorological data to provide a site selection solution under a climate adaptation change.

BRIEF DESCRIPTION OF THE DRAWINGS

FIG. 1 is a flow chart of a method for siting heat wave monitoring stations based on risk evaluation according to a first embodiment of the present application.

DETAILED DESCRIPTION

Figure 2:
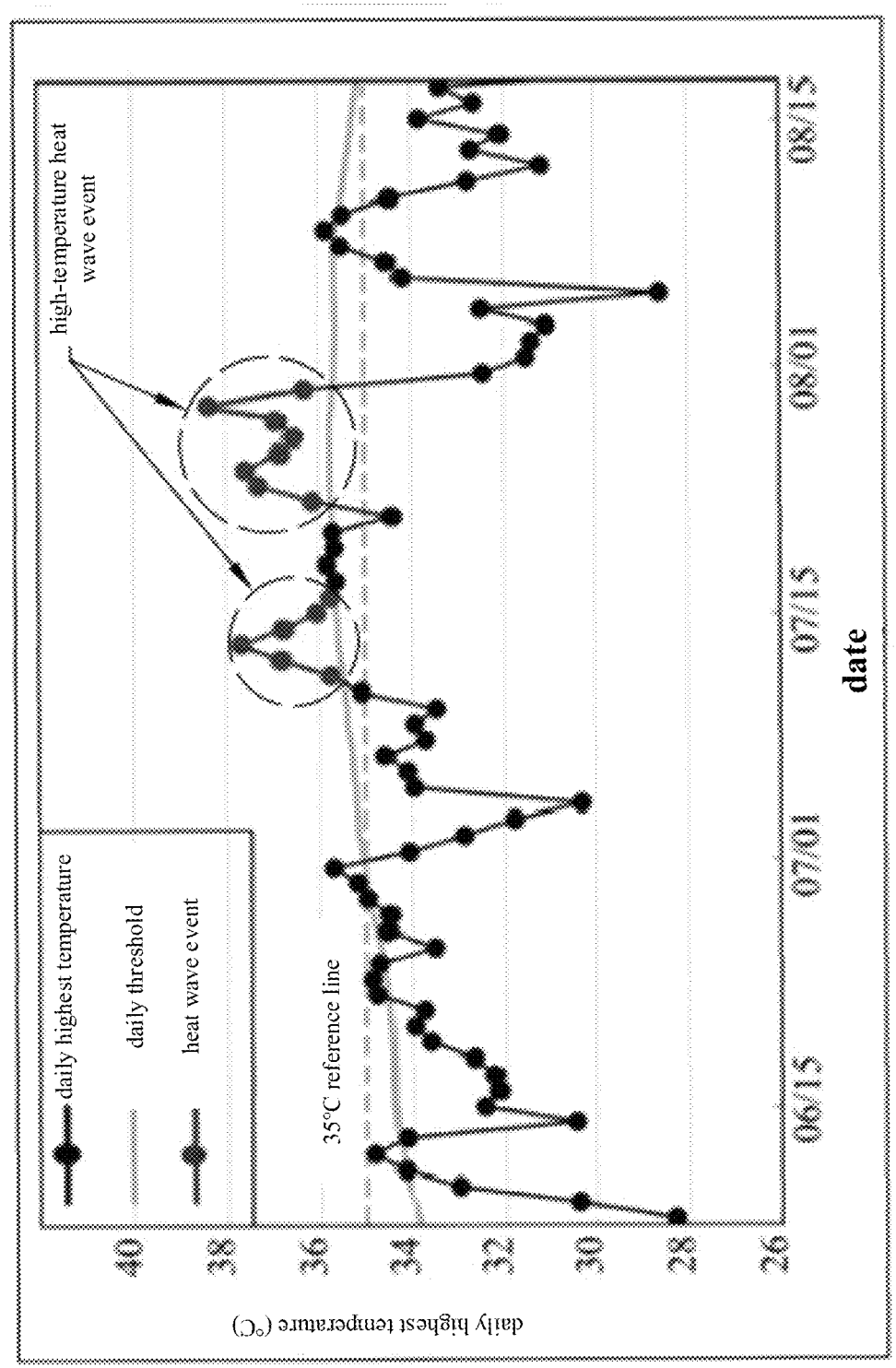
FIG. 2 is an identification logic diagram of a high-temperature heat wave event in the first embodiment of the present application.

The present application is described in further detail below with reference to FIGS. 1 to 10.

First Embodiment

Referring to FIG. 1, the present application discloses a method for siting heat wave monitoring stations based on risk evaluation, including:

S10: acquiring historical meteorological data of a target region, and preprocessing the historical meteorological data according to spatial distribution and a time sequence to generate a gridded associated meteorological data set.

In the present embodiment, the target region refers to a region where site selection analysis of a heat wave monitoring station is required; associated meteorological data refers to basic meteorological data for identifying and quantifying high-temperature heat wave events and assisting in site selection of the heat wave monitoring station.

Specifically, the historical meteorological data of the target region is obtained, meteorological factors of the historical meteorological data at least include an air temperature, a relative humidity and an average wind speed, and the associated meteorological data is screened out from the historical meteorological data, such that the storage amount and the processing amount of the data are reduced, subsequent analysis of historical high-temperature heat wave events is facilitated, and meanwhile, the data is used for analyzing the site selection of the heat wave monitoring station.

The step S10 includes:

S11: acquiring the historical meteorological data of the target region, the meteorological factors of the historical meteorological data including the air temperature, the relative humidity and the average wind speed, and the historical meteorological data including a plurality of authoritative meteorological data sets; a grid refers to a region divided according to 0.25° (longitude)×0.25° (latitude) in the target region, and the grid can also be divided in other sizes according to actual requirements.

In the present embodiment, the target region is China or a region in China, and the method for siting heat wave monitoring stations based on risk evaluation according to the present application can also be applied to other regions according to actual requirements.

Specifically, the historical meteorological data set is obtained from an authoritative meteorological department, and preferably, the historical meteorological data in the present application includes a meteorological data set CN05.1 obtained from the climate change research center of the Chinese Academy of Sciences and a reanalysis data set ERA5 obtained from the European Centre for Medium- Range Weather Forecasts; the historical meteorological data used in the technical solution of the present application is daily meteorological data generated from 1961 and at least includes meteorological data of 30 complete years; the spatial resolution of the selected meteorological data set is at least 0.25° (longitude)×0.25° (latitude); in other embodiments of the present application, other authoritative meteorological data sets may be selected based on actual requirements of a position of the target region.

S12: preprocessing the historical meteorological data according to the spatial distribution and the time sequence, the preprocessing including data format conversion, abnormal value elimination and missing value filling.

In the present embodiment, the preprocessing means that data from different data sources is converted into the same format, and then, abnormal value elimination and missing value filling are performed; an abnormal value refers to a value which does not conform to an expected behavior, and includes a value showing an abnormal performance compared with spatially adjacent points and a value showing an abnormal performance compared with points at previous and later moments.

Specifically, since the CN05.1 data set and the ERA5 data set are both gridded meteorological data sets, if the meteorological data of the selected authoritative meteorological data set is station data, the meteorological data is required to be converted into gridded data through spatial interpolation; the spatial resolutions and the grid division positions of different authoritative meteorological data sets may have partial differences; therefore, the acquired CN05.1 data set and the acquired ERA5 data set are subjected to geometric cutting, reprojection and resampling, such that the data sets of two different data sources completely correspond to each other; since the CN05.1 data set is collected by the meteorological department of China, the data in the CN05.1 data set is more accurate relative to the ERA5 data set for the target region in China; and the abnormal value in the data set is eliminated, a missing value in the data set is complemented, the data existing in both the CN05.1 data set and the ERA5 data set and having a difference is subjected to the CN05.1 data set, and missing data in the CN05.1 data set is complemented using the ERA5 data set.

S13: acquiring a daily highest temperature of each of the grids in the target region, as well as humidity data and wind speed data corresponding to the daily highest temperature from the historical meteorological data to generate the associated meteorological data set.

Specifically, since a time resolution of the CN05.1 data set is day, a daily average relative humidity and a daily average wind speed included in the CN05.1 data set are not the relative humidity and the average wind speed corresponding to a moment of the daily highest temperature. Therefore, hourly meteorological data in the ERA5 data set is required to be introduced, and the relative humidity and the average wind speed at the corresponding moment are retrieved from the ERA5 data set based on the moment of the daily highest temperature in CN05.1. The associated meteorological data set is generated based on the daily highest temperature of each of the grids in the target region, as well as the corresponding relative humidity data and average wind speed data.

In combination with the meteorological data set with high quality in the China region and the international mainstream reanalysis data set, data preprocessing is performed, and the data, such as the air temperature, the relative humidity, the average wind speed, or the like, of each of the grids are extracted to generate the associated meteorological data set, which improves the data quality and the data integrity, and facilitates improvements of the observation precision of the high-temperature heat wave event and the accuracy of site selection analysis of the heat wave monitoring station.

S20: identifying historical high-temperature heat wave events based on the associated meteorological data set, and calculating heat wave feature parameters and summary indexes thereof of grids based on occurrence times and daily heat wave magnitudes of the historical high-temperature heat wave events.

In the present embodiment, the historical high-temperature heat wave event refers to a high-temperature heat wave event which occurs within a study time range of the target region; the heat wave feature parameters refer to parameters which are determined after analysis of time parameters of the historical high-temperature heat wave events and used for describing the occurrence conditions of the historical high-temperature heat wave events of the grids of the target region.

Specifically, based on the associated meteorological data set, the conditions of historical associated meteorological data are analyzed, such that the occurrence time and the daily heat wave magnitude of each high-temperature heat wave event which occurs in the target region historically are determined, so as to further calculate the heat wave feature parameters thereof, and analyze the conditions of the historical high-temperature heat wave events occurring in each of the grids in the target region.

The step S20 includes:

S21: determining a daily high-temperature data set $A_d = U_{y_s}^{y_e} U_{i=d-15}^{d+15} T_{y,j}$ of each of the grids based on the associated meteorological data sets, defining an Nth percentile in the daily high-temperature data set $A_d$ as a high-temperature threshold, defining a day with the daily highest temperature greater than the high-temperature threshold as a high-temperature day, and defining three continuous high-temperature days as the high-temperature heat wave event.

In the present embodiment, $U_{y_s}^{y_e}$ is a set of daily highest temperature data in years ys to ye in the associated meteorological data set, d is a selected target date, $U_{i=d-15}^{d+15}$ is a set of daily highest temperature data in a window period of 15 days before and after the date d, and $T_{y,j}$ is a daily highest temperature of the jth day of the year y; $A_d$ is a data set of the daily highest temperatures counted in any determined date d and the window period of 15 days before and after the date d in the reference period from ys to ye; the daily highest temperature is a highest temperature in each day.

Specifically, according to actual requirements of research of the high-temperature heat wave event on the target region, the start and stop years ys and ye of a historical time range to be researched are determined, the historical time range to be researched is at least 30 years, and the set $U_{y_s}^{y_e}$ of the daily highest temperature data in the years ys to ye is acquired based on the associated meteorological data set; the research object date d is determined, whether the date d is a high-temperature day is judged, and the set $U_{i=d-15}^{d+15}$ of the daily highest temperature data of the determined window period of 15 days before and after the date d is acquired based on the associated meteorological data set; $U_{i=d-15}^{d+15}$ is a subset of $U_{y_s}^{y_e}$, a daily high temperature data set $A_d$ is determined according to formula $A_d = U_{y_s}^{y_e} U_{i=d-15}^{d+15} T_{y,j}$, and $T_{y,j}$ is an element in the data set $A_d$.

Since the data set $A_d$ includes a plurality of elements of the daily highest temperature data, the elements in the data set $A_d$ are sorted in an ascending order, corresponding cumulative percentiles are calculated, a temperature value of the element closest to the Nth percentile is defined as the high temperature threshold, and N is preferably 90. Therefore, the high temperature threshold is a floating threshold; if the daily highest temperature of the date d is greater than the high temperature threshold determined on the day, the date d is defined as a high-temperature day; three or more consecutive high-temperature days are recorded as one heat wave event.

Further, since temperatures of some regions are low, a standard for determining the high temperature threshold according to the Nth percentile of the data set $A_d$ may not be reasonable, and therefore, a bottom line of the high temperature threshold may be set, and only when the daily highest temperature is greater than the high temperature threshold determined on the day and meanwhile greater than the bottom line of the high temperature threshold, the day is determined as the high-temperature day, and preferably, the bottom line of the high temperature threshold may be set to 35° C.

For the judgment of the high-temperature heat wave event, compared with a currently common absolute threshold method (that is, the situation that daily highest temperatures in continuous three days are higher than or equal to 35° C. is used as a judgment standard for the high-temperature heat wave event), in the present embodiment, an influence of local historical climate of each of the grids and a tolerance degree of persons of different regions for the high-temperature weather are considered, so as to more scientifically and reasonably identify the high-temperature heat wave event.

FIG. 2 is a heat wave identification logic diagram of the method for siting heat wave monitoring stations based on risk evaluation according to the present application, and specifically records the daily highest temperature data of a plurality of times before and after July 15th, the daily highest temperature in the diagram is the highest temperature of a day, the daily threshold is the high temperature threshold of the day, the event that temperatures of continuous three days exceed the daily threshold line and the 35° C. reference line simultaneously is one high-temperature heat wave event, and the high-temperature heat wave event is identified by determining a relationship between the daily highest temperature and the daily high temperature threshold in the associated meteorological data set.

S22: calculating a sensible temperature $AT_d=1.07T_d+0.2e-0.65V-2.7$ of each of the grids based on the associated meteorological data set, wherein $$e = \frac{RH}{100} \times 6.105 \times \exp\frac{17.27T}{237.7+T}.$$

In the present embodiment, $AT_d$ is the highest sensible temperature on the date d, $T_d$ is the daily highest temperature on the date d, e is a water vapor pressure, V is the wind speed, and RH is the relative humidity.

Specifically, the daily highest sensible temperature $AT_d$ is calculated based on the associated meteorological data set using the formulas $$AT_d = 1.07T_d + 0.2e - 0.65V - 2.7 \text{ and } e = \frac{RH}{100} \times 6.105 \times \exp\frac{17.27T}{237.7+T};$$

influences of the relative humidity and the wind speed in the meteorological factors on the sensible temperature of a person can be conveniently and subsequently brought into the consideration for judgment of the severity of the high-temperature heat wave event.

S23: calculating the daily heat wave magnitude $M_d$ of each of the grids based on the associated meteorological data set and the sensible temperature $AT_d$, wherein $$M_d = \begin{cases} \frac{T_d - T_{y25p}}{T_{y75p} - T_{y25p}}, & \text{if } T_d > T_{y25p} \text{ and } T_d \geq AT_d \\ \frac{AT_d - T_{y25p}}{T_{y75p} - T_{y25p}}, & \text{if } T_d > T_{y25p} \text{ and } T_d < AT_d \\ 0, & \text{if } T_d \leq T_{y25p} \end{cases}$$

In the present embodiment, $T_{y25p}$ and $T_{y75p}$ are 25th and 75th percentiles of annual highest temperatures of the reference period of the years ys to ye respectively; the heat wave magnitude is a grade used to assess the severity of the high-temperature heat wave event.

The heat wave magnitude is calculated through a larger value between the daily highest temperature and the daily highest sensible temperature, such that the influences of the factors of the temperature, the humidity and the wind speed on a human body are considered comprehensively when the severity of the high-temperature heat wave event is evaluated, the solution is more scientific compared with a solution in which only the temperature factor is considered, underestimation of damage of a high temperature and a high humidity in the traditional method is made up, and damage of the heat wave event on health of the human body can be reflected better.

S24: calculating an average heat wave magnitude, a heat wave days and a heat wave frequency corresponding to each of the grids based on the occurrence time and the daily heat wave magnitude of the high-temperature heat wave event of each of the grids in a reference period, so as to generate the heat wave feature parameters.

In the present embodiment, a statistical period refers to a time period for analyzing the conditions of the high-temperature heat wave event of each of the grids and calculating the heat wave feature parameters, and preferably, one natural year is used as one statistical period; the average heat wave magnitude is an average value of the daily heat wave magnitudes $M_d$ in one statistical period, the heat wave days is a number of days of the high-temperature heat wave events in one statistical period, and the heat wave frequency is a number of the high-temperature heat wave events in one statistical period.

Specifically, all the heat wave occurrence times and all the daily heat wave magnitudes of each of the grids in one statistical period are analyzed, and the heat wave feature parameters of each of the grids are calculated:

by dividing a sum of the daily heat wave magnitudes in a heat wave period in one statistical period by the heat wave days in the statistical period, the average heat wave magnitude of the grid in the statistical period is calculated, and a time sequence of the average heat wave magnitudes of the grids in the reference period can be obtained by sequential calculation;

the heat wave days of the grid in the statistical period is determined according to the number of the days of all the high-temperature heat wave events occurring in one statistical period, and a time sequence of the heat wave days of the grids in the reference period can be obtained by sequential calculation;

the heat wave frequency of the grid in the statistical period is determined according to the number of all the high-temperature heat wave events occurring in one statistical period, and a time sequence of the heat wave frequencies of the grids in the reference period can be obtained by sequential calculation; and the average heat wave magnitude, the heat wave days and the heat wave frequency of each of the grids in the reference period are summarized to generate a heat wave feature data set of the corresponding grid in the reference period.

After the step S24, the method further includes:

S25: performing whitening preprocessing on the heat wave feature data set to eliminate autocorrelation of the heat wave feature data set.

Specifically, the whitening preprocessing is performed on the heat wave feature data set, such that the autocorrelation of the heat wave feature data set is eliminated, so as to reduce an influence of the data autocorrelation on data analysis, and improve the accuracy of subsequent trend analysis of the heat wave feature parameters.

S26: obtaining a trend degree of the heat wave frequency using a Mann-Kendall test method and a Sen slope estimation method.

Specifically, the variation trend of the heat wave feature parameters is detected using the Mann-Kendall test method and the Sen slope estimation method, such that the occurrence condition and the variation trend of the historical high-temperature heat wave events of each of the grids can be conveniently analyzed; when the variation trend of the heat wave feature parameters is analyzed using two nonparametric methods, namely the Mann-Kendall test method and the Sen slope estimation method, the data in the heat wave feature data set is not required to conform to any specific distribution, the interference of a few abnormal values is avoided, the trend degree is estimated by calculating a mid-value of sequence slope pairs, the noise immunity is high, and the problem that a traditional linear regression method is easily influenced by the abnormal values when the linear trend of the time sequence is estimated is solved.

The step S26 further includes:

S261: testing the heat wave feature data set using the Mann-Kendall test method, and calculating corresponding S statistics, variances Var(S) of the S statistics and ZS scores according to the time sequences of the heat wave feature parameters one by one.

Specifically, the heat wave feature data set is tested using the Mann-Kendall test method, the corresponding S statistics are calculated for the time sequences of the heat wave feature parameters one by one, and a calculation formula of the S statistics is $S=\sum_{k=1}^{n-1}\sum_{j=k+1}^{n}\text{sgn}(x_j-x_k)$.

The variances Var(S) of the statistics and the ZS scores are further calculated, and specific calculation formulas are:

$$ZS = \begin{cases} \dfrac{S-1}{\sqrt{\text{Var}(S)}}; & S>0 \\ 0; & S=0 \\ \dfrac{S+1}{\sqrt{\text{Var}(S)}}; & S<0 \end{cases},$$

$$\text{Var}(S) = \dfrac{n(n-1)(2n+5)-\sum_{k=1}^{n}t_k k(k-1)(2k+5)}{18},$$

wherein n is a number of the time sequences x, and $x_j$ and $x_k$ are values of the time sequence x at k and j (j>k).

S262: calculating a variation amplitude of a time sequence of the heat wave frequency in the reference period using the Sen slope estimation method as the trend degree of the heat wave frequency.

S27: performing abrupt change detection on the heat wave features using the Mann-Kendall test method and a sliding T test method, so as to determine an abrupt change point and a corresponding abrupt change time point.

Specifically, a climate abrupt change is an important phenomenon commonly existing in a climate system, and the heat wave feature abrupt change point and the corresponding time of the target region are detected using the Mann-Kendall test method and the sliding T test method, such that the accuracy of a subsequent analysis result of the change trend of the high-temperature heat wave event of the target region can be improved, the heat wave trends of different regions can be further compared, whether the heat wave feature of a concerned region has an obvious abrupt change point or not can be determined, and if the abrupt change point exists, a time after the abrupt change point is taken as the stable phase, so as to perform following analysis on the heat wave feature parameters of the stable phase.

Further, the summary index based on the heat wave features of each of the grids in the reference period includes an annual average heat wave magnitude, an annual average heat wave days and a trend degree of the heat wave frequency corresponding to each of the grids. The trend analysis and abrupt change point test are performed on the time sequence of the heat wave frequency in the reference period to obtain the trend degree of the heat wave frequency and the abrupt change time point, the subsequence after the abrupt change time point is defined as the stable phase, and the average heat wave magnitudes and the heat wave days in the stable phase are averaged with a natural year as the statistical period, so as to obtain the annual average heat wave magnitude and the annual average heat wave days respectively.

The step S27 further includes:

S271: testing the heat wave feature data set using the Mann-Kendall test method, detecting the abrupt change according to the time sequences of the heat wave feature parameters one by one, and when curve $UB_k$ and curve $UF_k$ have an intersection point and the intersection point is within a confidence level, marking the intersection point as the abrupt change point, and determining the corresponding abrupt change time point.

Figure 3:
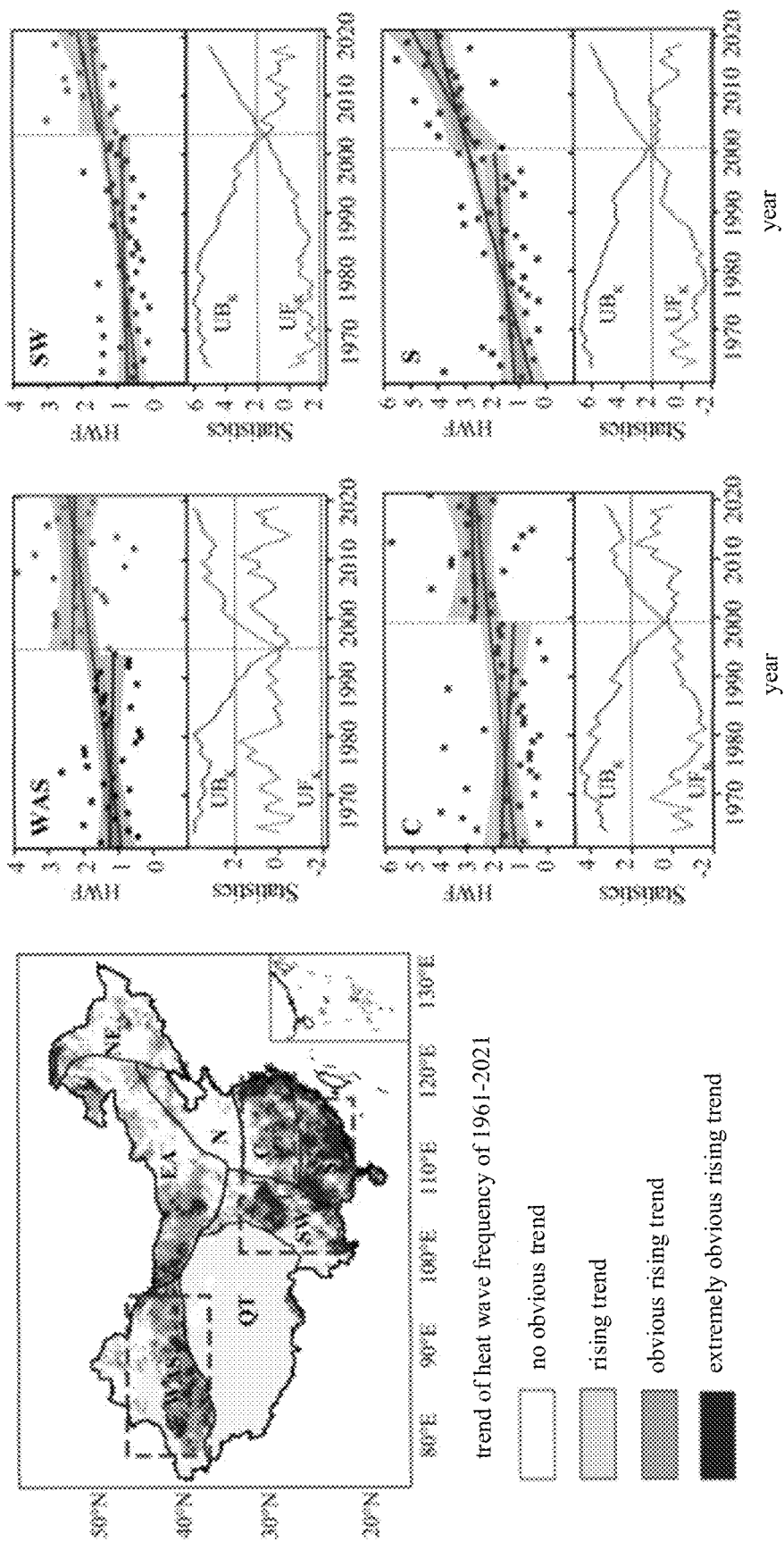
FIG. 3 is distribution of a heat wave frequency in different climate regions and a Mann-Kendall test result in the first embodiment of the present application.

Specifically, the heat wave feature data set is detected using the Mann-Kendall test method, the abrupt change is detected according to the time sequences of the heat wave feature parameters one by one, the left side of FIG. 3 shows a Chinese climate division map which includes climate regions WAS, EA, NE, N, C, S, SW, QT, or the like, and the right side of FIG. 3 shows charts of analysis of the heat wave frequencies HWF of the climate regions WAS, SW, C and S from 1961 to 2021 using the Mann-Kendall test method and the Sen slope estimation method, such that the variation trend of the occurrence frequency of the high-temperature heat wave event is detected; the test shows that the heat wave frequency HWF data of the four regions with an obvious rising trend of the heat wave frequency are abruptly changed around the year 2000, the corresponding curves $UB_k$ and $UF_k$ of the four regions are intersected with each other around the year 2000, the year 2000 is used as the abrupt change time point of the heat wave feature parameters in the heat wave feature data set, and the corresponding abrupt change point is determined; therefore, the occurrence frequency of the high-temperature heat wave events in China after the year 2000 enters a new stable phase, and the time node coincides with the trend found by scholars in global heat wave research.

S272: performing a sliding T test on the abrupt change point, calculating average values of subsequences before and after the abrupt change point, and verifying rationality of the abrupt change point by judging whether a difference of the average values of the subsequences before and after the abrupt change point is obvious or not.

Specifically, after the abrupt change point is determined, the sliding T test is performed on the abrupt change point, the average values of the subsequences of the heat wave feature parameters before and after the abrupt change point are calculated, and the rationality of the abrupt change point is verified by judging whether the difference of the average values of the subsequences of the heat wave feature parameters before and after the abrupt change point is obvious or not.

S28: taking a subsequence after the abrupt change time point as a stable phase, and averaging the average heat wave magnitudes and the heat wave days in the stable phase to obtain an annual average heat wave magnitude and an annual average heat wave days of each of the grids in the stable phase respectively.

Specifically, the heat wave feature parameters before the abrupt change time point are removed, and average values of the average heat wave magnitudes and the heat wave days in the stable phase are counted to obtain the annual average heat wave magnitude and the annual average heat wave days of each of the grids in the stable phase.

S30: evaluating a priority of building a heat wave monitoring station in each of the grids based on spatial distribution features of the summary indexes (the annual average heat wave magnitude, the annual average heat wave days and the trend degree of the heat wave frequency) of heat wave features in the target region.

In the present embodiment, the heat wave monitoring station refers to a meteorological monitoring station for monitoring the high-temperature heat wave event, a common meteorological monitoring station can also be used as the heat wave monitoring station when meeting service conditions of the heat wave monitoring station, and the service conditions of the heat wave monitoring station are as follows: associated meteorological data related to monitoring of the high-temperature heat wave event can be provided for a heat wave monitoring organization, monitored meteorological factors at least including the air temperature, the relative humidity and the average wind speed; the station building priority is determined according to the monitoring requirements and importance of each of the grids for the high-temperature heat wave event and is used for determining the heat-wave-monitoring-station building priority of each of the grids.

Specifically, based on a temporal distribution rule and the spatial distribution feature of the summary index of each heat wave feature in the target region, the heat-wave-monitoring-station building priority of each of the grids is determined, and then, the station building priority corresponding to each of the grids is determined.

The step S30 includes:

S31: creating a heat wave intensity map, a heat wave days map and a heat wave frequency trend degree map based on the spatial distribution features of the summary indexes of the heat wave features in the target region.

Figure 4:
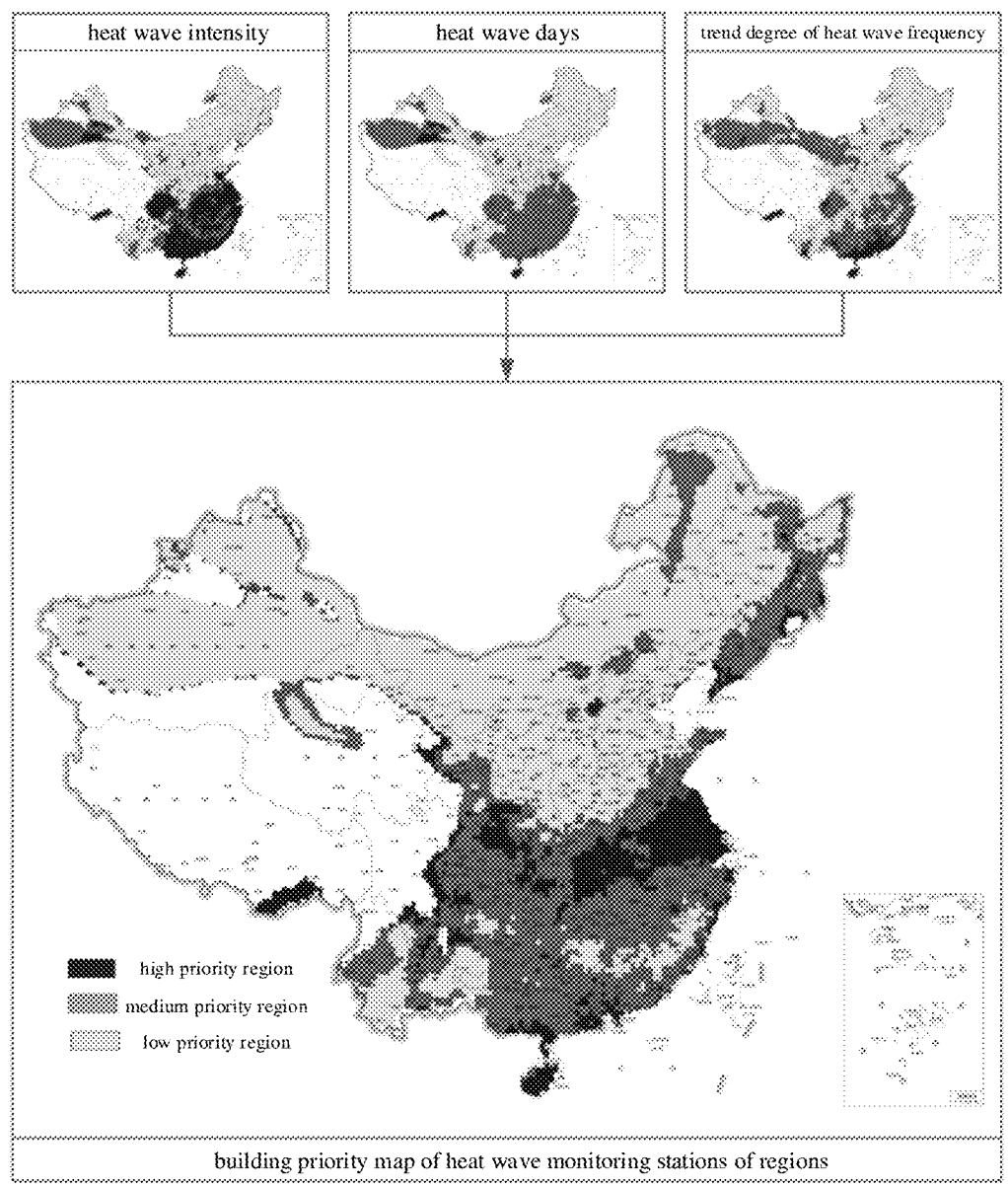
FIG. 4 is a building priority map in the first embodiment of the present application.

Referring to FIG. 4, in the present embodiment, the heat wave intensity map refers to a map generated after the annual average heat wave magnitude of each of the grids of the target region in the stable phase is marked, i.e., the heat wave intensity view in FIG. 4; the heat wave days map is a map generated after the annual average heat wave days of each of the grids of the target region in the stable phase is marked, i.e., the heat wave days view in FIG. 4; the heat wave frequency trend degree map refers to a map generated after the trend degree of the heat wave frequency of each of the grids of the target region in the reference period is marked, i.e., the heat wave frequency trend degree view in FIG. 4.

S32: determining an annual average heat wave magnitude grade, an annual average heat wave days grade and a heat wave frequency trend degree grade of each of the grids using a natural breakpoint method based on a heat wave magnitude intensity map, a heat wave days map and a heat wave frequency trend degree map.

In the present embodiment, the annual average heat wave magnitude grade, the annual average heat wave days grade and the heat wave frequency trend degree grade are grades determined by performing division using the natural breakpoint method according to values of the grids marked in the annual average heat wave magnitude map, the annual average heat wave days map and the heat wave frequency trend degree map respectively. Specifically, each of the annual average heat wave magnitude grade, the annual average heat wave days grade and the heat wave frequency trend degree grade can be set to be low, medium and high.

S33: setting weights of the annual average heat wave magnitude, the annual average heat wave days and the trend degree of the heat wave frequency respectively, the weight of the annual average heat wave days being larger than the weight of the annual average heat wave magnitude which is larger than the weight of the trend degree of the heat wave frequency.

Specifically, the weights of the annual average heat wave magnitude, the annual average heat wave days and the heat wave frequency trend degree can be set according to analysis requirements, and the condition that the weight of the annual average heat wave days is larger than the weight of the annual average heat wave magnitude which is larger than the weight of the heat wave frequency trend degree should be met when the weights are set.

S34: calculating the station building priority of each of the grids based on the annual average heat wave magnitude grade, the annual average heat wave days grade, the heat wave frequency trend degree grade as well as the weights of the annual average heat wave magnitude, the annual average heat wave days and the trend degree of the heat wave frequency of each of the grids, so as to generate a building priority map.

In the present embodiment, the building priority map refers to a map marked with each of the grids and the station building priority corresponding to each of the grids; the station building priority includes high priority, medium priority, low priority and zero priority.

Specifically, based on the annual average heat wave magnitude grade, the annual average heat wave days grade, the heat wave frequency trend degree grade, the weight of the corresponding annual average heat wave magnitude, the weight of the corresponding annual average heat wave days and the weight of the corresponding trend degree of the heat wave frequency of each of the grids, the station building priority of each of the grids is determined by means of weighting calculation, and the building priority map is generated based on the station building priority of each of the grids.

Specifically, in an embodiment of the present application, when the station building priority is evaluated, a grid with the annual average heat wave days grade being a high grade and the annual average heat wave magnitude grade or the heat wave frequency trend degree grade being a high grade may be defined to have high priority; a grid with the annual average heat wave days grade being a low grade, or the annual average heat wave magnitude grade being a low grade, and the heat wave frequency trend degree grade being a low grade can be defined to have low priority; remaining cases may be defined to have medium priority; regions without the high-temperature heat wave events, such as regions in Qinghai-Tibet Plateau, are defined to have zero priority; the building priority map is shown in FIG. 4.

S40: acquiring multi-source data of each of the grids in the target region, and evaluating a heat wave risk of each of the grids to generate a heat wave risk map.

In the present embodiment, the multi-source data refers to various kinds of data related to the heat wave risks of the grids in the target region and acquired through a plurality of channels, and includes meteorological data, satellite data, socioeconomic data, health data, and environmental data; the heat wave risk map refers to a map marked with each of the grids and the heat wave risk corresponding to each of the grids.

Specifically, the multi-source data of each of the grids in the target region is obtained, the probability and the severity of the high-temperature heat wave event of each of the grids, as well as information, such as the population, the environment, the resources, the economic development degree, or the like, in each of the grids are analyzed, such that the risk of the influence of the high-temperature heat wave event on each of the grids is comprehensively evaluated, and therefore, the heat wave risk map is generated, thus facilitating subsequent assistance in the site selection of the heat wave monitoring station according to the heat wave risk map, so as to improve the scientificity of the site selection of the heat wave monitoring station.

The step S40 includes:

S41: acquiring the multi-source data of each of the grids, and performing format conversion, abnormal value elimination and missing value filling on the multi-source data.

Specifically, the multi-source data of each of the grids is obtained, data from different data sources is converted into the same format, abnormal values in the multi-source data are removed, and missing data is complemented, such that the multi-source data can be conveniently analyzed subsequently.

S42: based on the building priority map, analyzing a probability, intensity and duration of the high-temperature heat wave event of each of the grids to evaluate a harmfulness index of each of the grids by the high-temperature heat wave event.

In the present embodiment, the harmfulness index refers to specific data for evaluating the occurrence probability and severity of the high-temperature heat wave event. Specifically, based on the building priority map, the probability, the intensity and the duration of the high-temperature heat wave event of each of the grids are analyzed, and the harmfulness index of each of the grids by the high-temperature heat wave event is evaluated based on the associated meteorological data set; the harmfulness index refers to specific data corresponding to a harmfulness indicator, and the harmfulness indicator includes the annual average heat wave magnitude, the annual average heat wave days, the heat wave frequency and a night lowest temperature; the threat degree of the long-term high-temperature heat wave event to the crowd and the environment can be evaluated.

Specifically, in some embodiments of the present application, a method for evaluating the threat degree of the long-term high-temperature heat wave event to the crowd and the environment includes performing time sequence analysis on simulation results of historical weather or future weather based on a climate model (such as a weather research and forecasting model (WRF)) to determine an annual average value and a development trend of each harmfulness indicator. Furthermore, when the historical weather is simulated, verification can be performed in combination with historical weather station data, so as to guarantee the reliability of the simulation result.

S43: analyzing population and land utilization data of each of the grids based on the multi-source data to evaluate an exposure index for an influence of the high-temperature heat wave event.

In the present embodiment, the exposure index refers to specific data for evaluating an exposure factor which may be affected by the high-temperature heat waves. Specifically, population spatial distribution features during the heat wave are analyzed based on the multi-source data; surface temperature spatial distribution features of different land utilization during the heat wave are analyzed; and the exposure index in each of the grids for the influence of the high-temperature heat wave can be evaluated.

S44: analyzing population data, resource data, environmental data and economic development data of each of the grids based on the multi-source data to evaluate a vulnerability index for the influence of the high-temperature heat wave event.

In the present embodiment, the vulnerability index is specific data for evaluating the vulnerability of a person in the high-temperature heat wave event. Specifically, the population data, the resource data, the environmental data and the economic development data of each of the grids are analyzed based on the multi-source data to evaluate the vulnerability of each exposure factor for the influence of the high-temperature heat wave event;

the step specifically includes: assessing recuperability and adaptability of the exposure factor, such as availability of a public sunstroke preventing space and opportunities for medical care; and determining sensitive factors, such as population average ages, pre-existing health conditions, and socioeconomic status, so as to determine the corresponding vulnerability index when the exposure factor within each of the grids is affected by the high-temperature heat wave event.

S45: performing weighted average calculation based on the harmfulness index, the exposure index and the vulnerability index of each of the grids to generate a heat wave risk grade of each of the grids, so as to create the heat wave risk map.

In the present embodiment, the heat wave risk grade is a grade determined after the weighted average calculation is performed based on the harmfulness index, the exposure index, and the vulnerability index of each of the grids, and is used to determine the risk of the influence of the high-temperature heat wave event on each of the grids.

Specifically, the weighted average calculation is performed based on the harmfulness index, the exposure index and the vulnerability index of each of the grids, so as to generate the heat wave risk grade of each of the grids; and the heat wave risk grades of the grids are marked on the corresponding grids to create the heat wave risk map, so as to determine the risks of the influence of the high-temperature heat wave event on different grids.

Referring to FIG. 4, as can be seen from the above steps S30 and S31 to S34, the central urban regions of Guangzhou and Foshan are high priority regions, and regional-level heat wave risk evaluation is performed for the high priority regions, so as to provide further basis for site selection of the monitoring station.

Specifically, the central urban regions of Guangzhou and Foshan are divided into grids of 1 km×1 km, the grids in the regions are collected, and the multi-source data of the regions is collected; the harmfulness index, the exposure index and the vulnerability index of the heat wave risk are analyzed and calculated. The harmfulness index is measured by a sensible temperature index, a lasting days and a night lowest temperature during the heat wave; the exposure index is measured by a population size and a surface temperature of an outdoor space; the vulnerability index is measured by a per capital GDP, an age, a gender, an education level, and accessibility to a hospital space.

Figure 5:
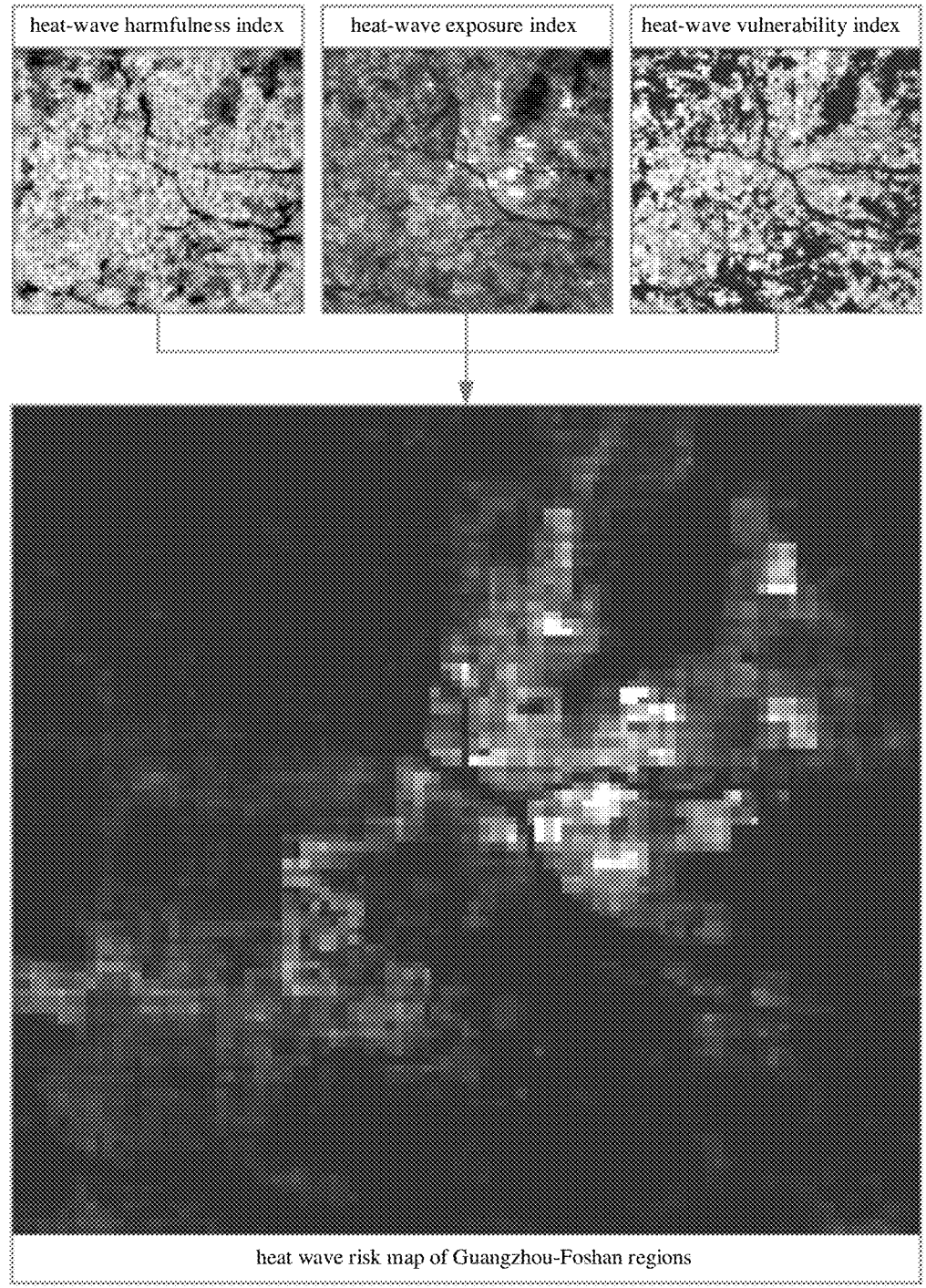
FIG. 5 is a heat wave risk map in the first embodiment of the present application.

Specifically, weights are assigned to the harmfulness index, the exposure index, and the vulnerability index according to relative importance thereof using the analytic hierarchy process (AHP); then, a comprehensive heat wave risk grade of each community in the city is calculated by summarizing the weighting indexes; and the heat wave risk map is drawn according to the heat wave risk index of the 1 km×1 km grid, and the heat wave risk maps of the central urban regions of Guangzhou and Foshan are shown in FIG. 5.

Specifically, in the present embodiment, simulation analysis is performed on the central urban regions of Guangzhou and Foshan by the WRF, and in the method, time sequence analysis may be performed on the simulation results of the historical weather or future weather, and when a future harmfulness indicator can be obtained based on future meteorological simulation, in cooperation with other prediction models (such as a population expansion model and a city expansion model), the exposure index and the vulnerability index during a future high-temperature heat wave event can be further obtained, such that a future heat wave risk grade of the region can be calculated to provide scientific bases for the site selection of the monitoring station.

S50: performing iterative computation using an optimization algorithm based on current station building information, temporal-spatial distribution features of meteorological factors and the heat wave risk map, so as to determine information of alternative station building positions.

In the present embodiment, the current station building information is information for recording positions and service ranges of currently existing, under-construction and to-be-built heat wave monitoring stations or meteorological monitoring stations capable of achieving the same functions as the heat wave monitoring stations; the information of alternative station building positions refers to position information of the to-be-built heat wave monitoring station determined after the site selection of the heat wave monitoring station is analyzed.

Specifically, based on the current station building information, the information of the heat wave monitoring station and the meteorological monitoring station which exist or are planned to be built in the target region is determined; further according to the temporal-spatial distribution features of all the meteorological factors in the target region and the heat wave risk map, the iterative calculation is performed using the optimization algorithm to determine the information of alternative station building positions, thereby improving the scientificity of the site selection of the to-be-built heat wave monitoring station.

The step S50 includes:

S51: acquiring the current station building information, and determining position information and service range information of an initial monitoring station.

In the present embodiment, the initial monitoring stations refer to currently existing, under-construction and to-be-built heat wave monitoring stations or meteorological monitoring stations capable of achieving the same functions as the heat wave monitoring stations.

Specifically, if no relevant known conditions exist, initial point positions of the monitoring stations are determined using a spatial clustering method based on a terrain height, the temporal-spatial distribution features of the meteorological factors and the heat wave risk map.

S52: determining a service radius of a heat wave monitoring station to be built in the target region based on a semivariable function fitting result of different meteorological factors.

Specifically, based on the semivariable function fitting result of different meteorological factors, the service radius of the heat wave monitoring station in the region is calculated, such that the number and the positions of the heat wave monitoring stations can be conveniently and reasonably planned subsequently.

S53: setting objective functions: max $U_{i=1}^{n} A_i$ and min $(n_H + n_M + n_L)$, as well as constraint functions: $D_{ij} \leq D_{max}$, $\Sigma_n A_{H\_i} \geq 0.95 A_H$, $n_H : n_M \geq 3$ and $n_H : n_L \geq 3$; and based on the optimization algorithm, performing iteration to obtain an approximate optimal solution, and determining the information of alternative station building positions.

In the present embodiment, $A_i$ is a service area of an ith station; $n_H$, $n_M$ and $n_L$ are numbers of the heat wave monitoring stations to be built at the high risk, the medium risk and the low risk respectively, values of $n_H$, $n_M$ and $n_L$ are larger than or equal to 1, $D_{ij}$ is a distance between the ith station and a jth station, $D_{max}$ is the service radius of the heat wave monitoring station to be built, $A_{H\_i}$ is an area of a high risk region covered by the ith station, and $A_H$ is a total area of high risk regions in the target region.

Specifically, the objective functions max $U_{i=1}^{n} A_i$ and min $(n_H + n_M + n_L)$ as well as the constraint functions $D_{ij} \leq D_{max}$, $\Sigma_n A_{H\_i} \geq 0.95 A_H$, $n_H : n_M \geq 3$ and $n_H : n_L \geq 3$ are set; based on the optimization algorithm, iteration is performed to obtain the approximate optimal solution, so as to determine the information of alternative station building positions; the optimization algorithm can be one or more of an ant colony algorithm, a tabu search algorithm and a genetic algorithm.

Further, the plurality of pieces of information of alternative station building positions are compared to manually screen a more appropriate alternative station building position solution.

Specifically, in the solution, with the spatial clustering algorithm as an initial step and in combination with service radius information, solving is performed by using the optimization algorithm; the alternative station building position solution of the heat wave monitoring station obtained using the two steps not only has strong space representativeness, but also can be combined with the service radii of the heat wave monitoring stations to reduce the number of the to-be-built heat wave monitoring stations to the highest extent under the condition of meeting the spatial distribution uniformity; furthermore, the solution has a high calculation efficiency in large and complex regions with different terrains.

Figure 7:
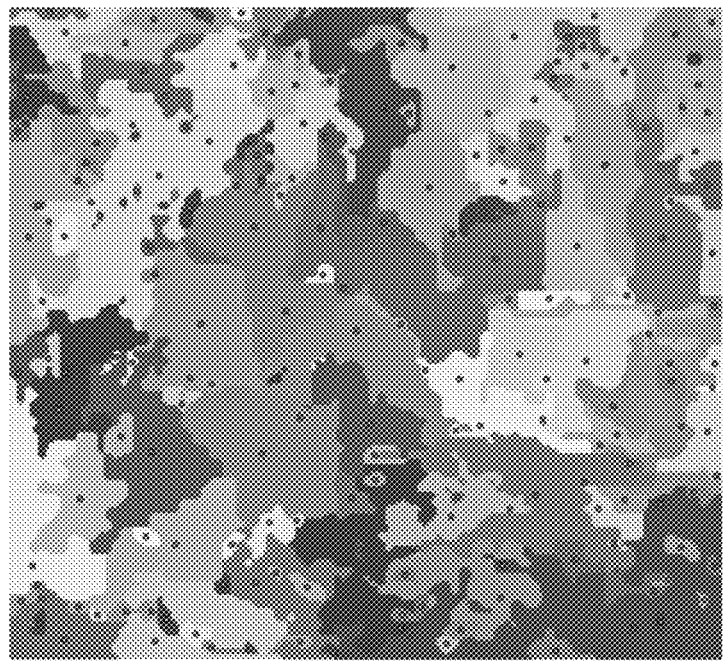
FIG. 7 is a diagram of an initial station building position in the first embodiment of the present application.

Specifically, in an embodiment of the present application, assuming that there is no initial monitoring station in the central urban regions of Guangzhou and Foshan, and other relevant station building information, the initial point positions of the heat wave monitoring stations are determined using K-means clustering according to the terrain height, monthly average values of the highest temperatures, the relative humidities and the wind speeds in June to August of the last five years which are calculated by the WRF, and the heat wave risk map, and the result is shown in FIG. 7.

Figure 6:
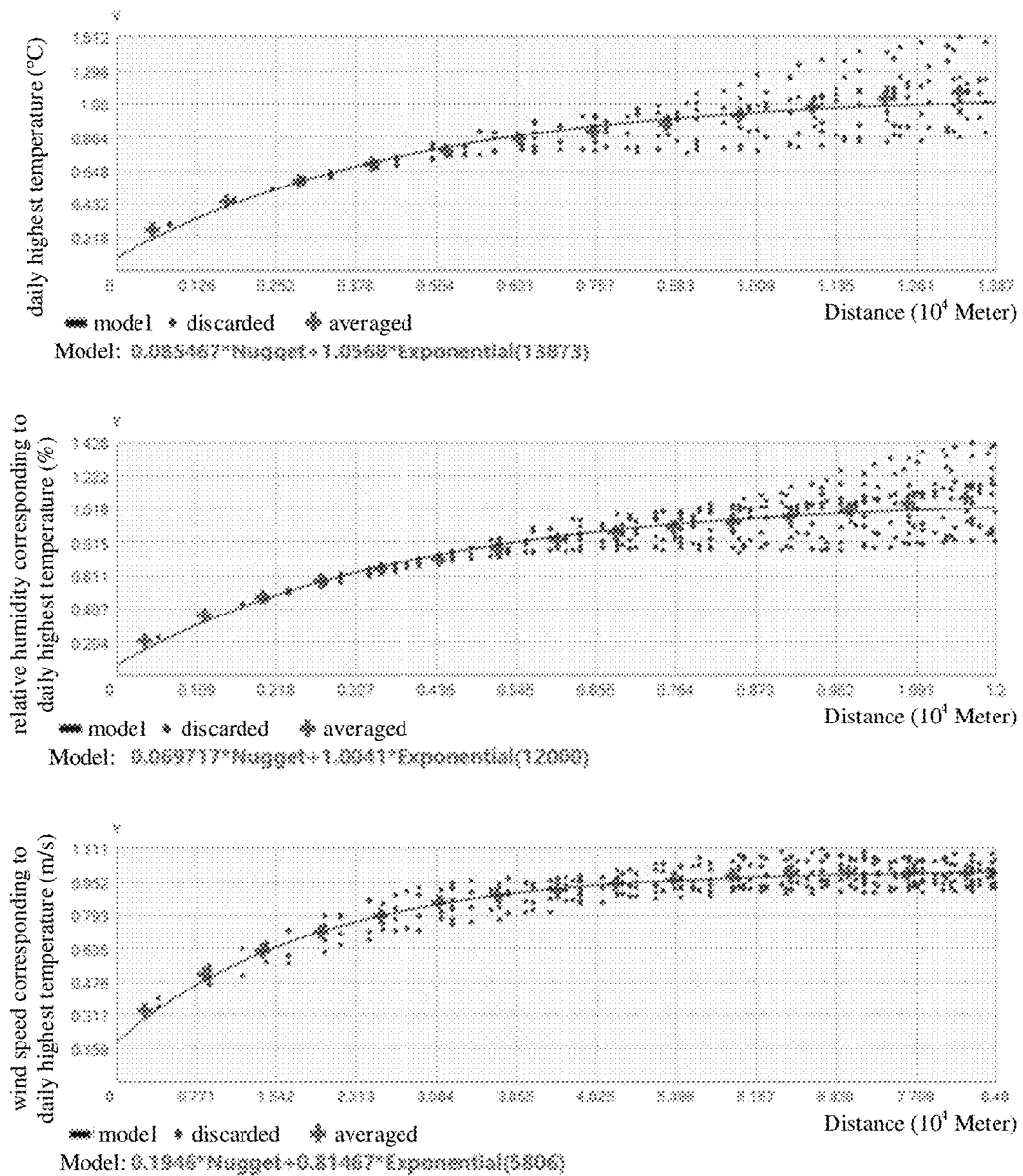
FIG. 6 is semivariable function best fitting curves and formulas for different meteorological factors in the first embodiment of the present application.
Figure 8:
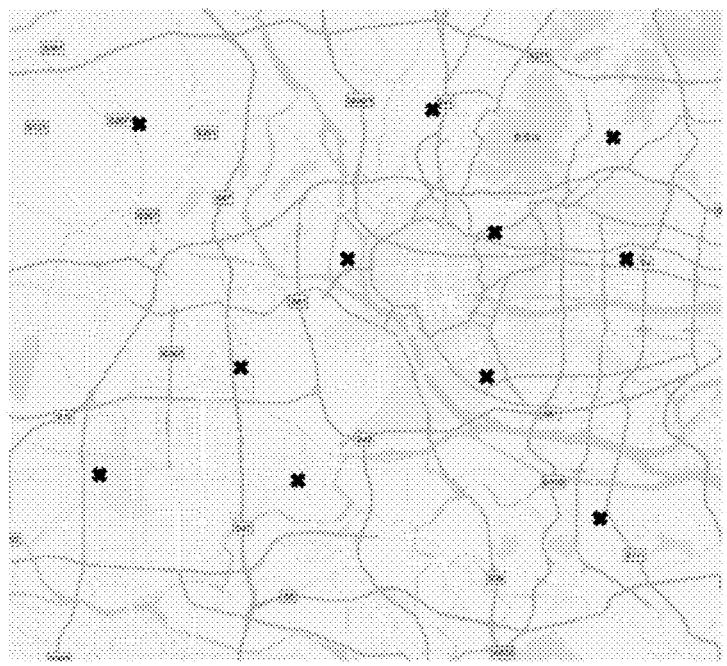
FIG. 8 is a diagram of an alternative station building position in the first embodiment of the present application.

Further, a spatial heterogeneity model of the air temperatures, the relative humidities and the wind speeds of the central urban regions of Guangzhou and Foshan in June to August of the last five years is established based on a semivariable function, a range is a spatial autocorrelation range of each meteorological factor, and the result is shown in FIG. 6; the ranges of the three factors are integrated, and it is assumed that the highest service radius of the heat wave monitoring station is 6 km; based on the objective function and the constraint function, iterative solving is performed using a genetic algorithm; the screened information of alternative station building positions is shown in FIG. 8.

S60: acquiring on-site survey information of each alternative station building position, and determining information of a position where a station is to be built.

In the present embodiment, the information of the position where the station is to be built refers to position information of the heat wave monitoring station required to be constructed finally after the information of alternative station building positions is adjusted according to the on-site survey condition.

Specifically, after the information of alternative station building positions is determined, the on-site survey information of each alternative station building position is obtained, and the final information of the position where the station is to be built is determined by fully considering the representativeness (for example, the geographical and climate features of the region where the station is located can be better reflected), comparability (for example, interference sources which cause abnormal changes of the meteorological factors cannot exist around the station) and foresight (for example, the future development of the city cannot have destructive influences on the station) of the meteorological monitoring station.

It should be understood that, the sequence numbers of the steps in the foregoing embodiments do not imply an execution sequence, and the execution sequence of each process should be determined by functions and internal logic of the process, and should not constitute any limitation to the implementation process of the embodiments of the present application.

Second Embodiment

Figure 9:
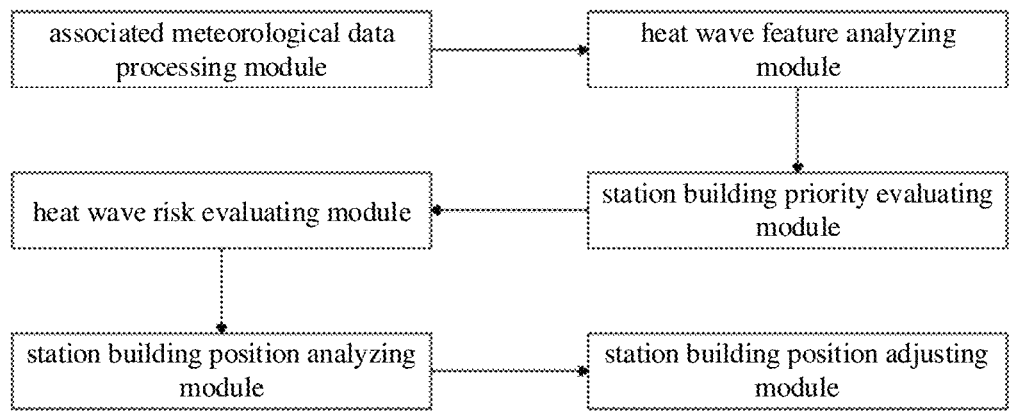
FIG. 9 is a schematic block diagram of a system for siting heat wave monitoring stations based on risk evaluation according to a second embodiment of the present application.

As shown in FIG. 9, a system for siting heat wave monitoring stations based on risk evaluation includes an associated meteorological data processing module, a heat wave feature analyzing module, a station building priority evaluating module, a heat wave risk evaluating module, a station building position analyzing module and a station building position adjusting module. The functional modules are detailed as follows:

The associated meteorological data processing module is configured to acquire historical meteorological data of a target region, and preprocess the historical meteorological data according to spatial distribution and a time sequence to generate a gridded associated meteorological data set;

the heat wave feature analyzing module is configured to identify historical high-temperature heat wave events based on the associated meteorological data set, and calculate heat wave feature parameters and summary indexes thereof of grids based on occurrence times and daily heat wave magnitudes of the high-temperature heat wave events;

the station building priority evaluating module is configured to evaluate a priority of building a heat wave monitoring station in each of the grids based on spatial distribution features of the summary indexes of heat wave features in the target region;

the heat wave risk evaluating module is configured to acquire multi-source data of each of the grids in the target region, and evaluate a heat wave risk of each of the grids to generate a heat wave risk map;

the station building position analyzing module is configured to perform iterative computation using an optimization algorithm based on current station building information, temporal-spatial distribution features of meteorological factors and the heat wave risk map, so as to determine information of alternative station building positions; and the station building position adjusting module is configured to acquire on-site survey information of each alternative station building position, and determine information of a position where a station is to be built.

The associated meteorological data processing module further includes:

a historical meteorological data acquiring submodule configured to acquire the historical meteorological data of the target region, the meteorological factors of the historical meteorological data including an air temperature, a relative humidity and an average wind speed, and the historical meteorological data including a plurality of authoritative meteorological data sets;

a historical meteorological data processing submodule configured to preprocess the historical meteorological data according to the spatial distribution and the time sequence, the preprocessing including data format conversion, abnormal value elimination and missing value filling; and an associated meteorological data set generating submodule configured to acquire a daily highest temperature of each of the grids in the target region, as well as humidity data and wind speed data corresponding to the daily highest temperature from the historical meteorological data to generate the associated meteorological data set.

The heat wave feature analyzing module further includes:

a high-temperature heat wave event determining submodule configured to determine a daily high-temperature data set $A_d = U_{y_s}^{y_e} U_{i=d-15}^{d+15} T_{y,j}$ of each of the grids based on the associated meteorological data sets, define an Nth percentile in the daily high-temperature data set $A_d$ as a high-temperature threshold, define a day with the daily highest temperature greater than the high-temperature threshold as a high-temperature day, and define three continuous high-temperature days as the high-temperature heat wave event;

a sensible temperature calculating submodule configured to calculate a sensible temperature $AT_d = 1.07T_d + 0.2e - 0.65V - 2.7$ of each of the grids based on the associated meteorological data set, wherein $$e = \frac{RH}{100} \times 6.105 \times \exp\frac{17.27T}{237.7+T};$$

a heat wave magnitude calculating submodule configured to calculate the heat wave magnitude $M_d$ of each of the grids based on the associated meteorological data set and the sensible temperature $AT_d$, wherein $$M_d = \begin{cases} \frac{T_d - T_{y25p}}{T_{y75p} - T_{y25p}}, & \text{if } T_d > T_{y25p} \text{ and } T_d \geq AT_d \\ \frac{AT_d - T_{y25p}}{T_{y75p} - T_{y25p}}, & \text{if } T_d > T_{y25p} \text{ and } T_d < AT_d \\ 0, & \text{if } T_d \leq T_{y25p} \end{cases};$$

a heat wave feature parameter generating submodule configured to calculate an average heat wave magnitude, a heat wave days and a heat wave frequency corresponding to each of the grids based on the occurrence time and the daily heat wave magnitude of the high-temperature heat wave event of each of the grids in a reference period, so as to generate the heat wave feature parameters;

a heat wave feature data set generating submodule configured to preprocess each heat wave feature parameter according to spatial distribution and a time sequence to generate a heat wave feature data set, and perform whitening preprocessing on the heat wave feature data set to eliminate autocorrelation of the heat wave feature data set;

a heat wave feature variation trend analyzing submodule configured to detect a variation trend of the heat wave feature parameter using a Mann-Kendall test method and a Sen slope estimation method;

a heat wave feature abrupt change detecting submodule configured to perform abrupt change detection on each heat wave feature parameter using the Mann-Kendall test method and a sliding T test method, so as to determine an abrupt change point and a corresponding abrupt change time point; and a heat wave feature summary index generating submodule configured to take a subsequence after the abrupt change time point as a stable phase, and average the average heat wave magnitudes and the heat wave days in the stable phase to obtain an annual average heat wave magnitude and an annual average heat wave days of each of the grids in the stable phase respectively; and integrate the annual average heat wave magnitudes and the annual average heat wave days of the grids in the stable phase and the trend degrees of the heat wave frequencies of the grids in the reference period into the summary indexes of the heat wave features.

The heat wave feature variation trend analyzing submodule further includes:

a Mann-Kendall test submodule configured to test the heat wave feature data set using the Mann-Kendall test method, and calculate corresponding S statistics, variances Var(S) of the S statistics and ZS scores according to the time sequences of the heat wave feature parameters one by one, wherein $$S = \sum_{k=1}^{n-1}\sum_{j=k+1}^{n}\text{sgn}(x_j - x_k),$$

$$ZS = \begin{cases} \frac{S-1}{\sqrt{\text{Var}(S)}}; & S > 0 \\ 0; & S = 0 \\ \frac{S+1}{\sqrt{\text{Var}(S)}}; & S < 0 \end{cases},$$

$$\text{and Var}(S) = \frac{n(n-1)(2n+5) - \sum_{k=1}^{n} t_k k(k-1)(2k+5)}{18};$$

a Sen slope estimating submodule configured to calculate a variation amplitude of a time sequence of the heat wave frequency in the reference period using the Sen slope estimation method as the trend degree of the heat wave frequency.

The heat wave feature abrupt change detecting submodule further includes:

an abrupt change point detecting submodule configured to test the heat wave feature data set using the Mann-Kendall test method, detect the abrupt change according to the time sequences of the heat wave feature parameters one by one, and when curve $UB_k$ and curve $UF_k$ have an intersection point and the intersection point is within a confidence level, mark the intersection point as the abrupt change point, and determine the corresponding abrupt change time point;

an abrupt change point verifying submodule configured to perform a sliding T test on the abrupt change point, calculate average values of subsequences before and after the abrupt change point, and verify rationality of the abrupt change point by judging whether a difference of the average values of the subsequences before and after the abrupt change point is obvious or not.

The station building priority evaluating module further includes:

a heat wave feature spatial distribution analyzing submodule configured to create a heat wave intensity map, a heat wave days map and a heat wave frequency trend degree map based on the spatial distribution features of the heat wave feature parameters of the heat wave feature data set after the abrupt change time point in the target region;

a grid grade evaluating submodule configured to determine an annual average heat wave magnitude grade, an annual average heat wave days grade and a heat wave frequency trend degree grade of each of the grids using a natural breakpoint method based on a heat wave intensity map, a heat wave days map and a heat wave frequency trend degree map;

a heat wave feature weight setting submodule configured to set weights of the annual average heat wave magnitude, the annual average heat wave days and the trend degree of the heat wave frequency respectively, the weight of the annual average heat wave days being larger than the weight of the annual average heat wave magnitude which is larger than the weight of the trend degree of the heat wave frequency; and a building priority map generating submodule configured to calculate the station building priority of each of the grids based on the annual average heat wave magnitude grade, the annual average heat wave days grade, the heat wave frequency trend degree grade as well as the weights of the annual average heat wave magnitude, the annual average heat wave days and the trend degree of the heat wave frequency of each of the grids, so as to generate a building priority map.

The heat wave risk evaluating module further includes:
a multi-source data acquiring submodule configured to acquire the multi-source data of each of the grids, and perform format conversion, abnormal value elimination and missing value filling on the multi-source data;
a harmfulness evaluating submodule configured to, based on the building priority map, analyze a probability, intensity and duration of the high-temperature heat wave event of each of the grids to evaluate the harmfulness index of each of the grids by the high-temperature heat wave event;
an exposure evaluating submodule configured to analyze population and land utilization data of each of the grids based on the multi-source data to evaluate the exposure index for an influence of the high-temperature heat wave event;
a vulnerability evaluating submodule configured to analyze population data, resource data, environmental data and economic development data of each of the grids based on the multi-source data to evaluate the vulnerability index for the influence of the high-temperature heat wave event; and
a heat wave risk map creating submodule configured to perform weighted average calculation based on the harmfulness index, the exposure index and the vulnerability index of each of the grids to generate a heat wave risk grade of each of the grids, so as to create the heat wave risk map.

The station building position analyzing module further includes:
an initial monitoring station analyzing submodule configured to acquire the current station building information, and determine position information and service range information of an initial monitoring station;
a service radius analyzing submodule configured to determine a service radius of a heat wave monitoring station to be built in the target region based on a semivariable function fitting result of different meteorological factors; and
a station building position information determining submodule configured to set objective functions max $U_{i=1}^{n} A_i$ and min $(n_H+n_M+n_L)$, as well as constraint functions $D_{ij} \leq D_{max}$, $\Sigma_n A_{H\_i} \geq 0.95 A_H$, $n_H:n_M \geq 3$ and $n_H:n_L \geq 3$; and based on the optimization algorithm, perform iteration to obtain an approximate optimal solution, and determine the information of alternative station building positions.

For specific limitations of the system for siting heat wave monitoring stations based on risk evaluation, reference may be made to the above limitations of the method for siting heat wave monitoring stations based on risk evaluation, which are not repeated herein; all or part of the modules in the system for siting heat wave monitoring stations based on risk evaluation can be implemented through software, hardware and combinations thereof, the modules can be embedded into a processor in a computer device in a hardware form or independent of the processor, or can be stored in a memory in the computer device in a software form, such that the processor can conveniently call the modules to execute operations corresponding to the modules.

Figure 10:
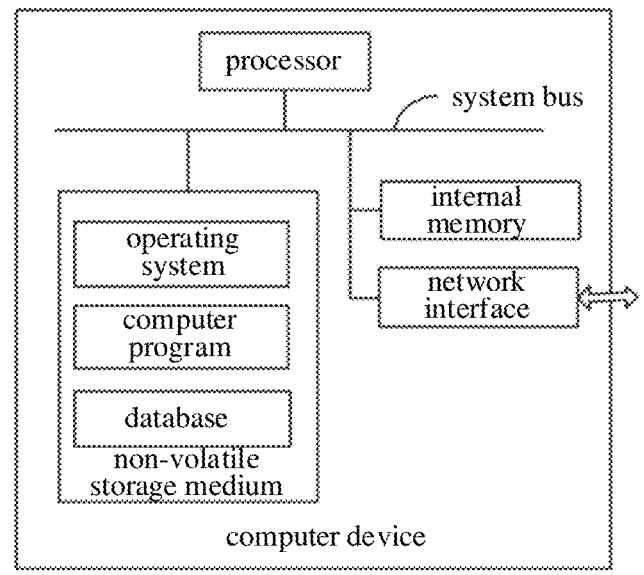
FIG. 10 is a schematic diagram of a device according to a third embodiment of the present application.

In an embodiment, there is provided a computer device which may be a server, and an internal structure diagram thereof may be shown in FIG. 10. The computer device includes a processor, a memory, a network interface, and a database connected by a system bus. The processor of the computer device is configured to provide computing and control capabilities. The memory of the computer device includes a non-volatile storage medium and an internal memory. The non-volatile storage medium stores an operating system, a computer program, and the database.

The internal memory provides an environment for running of the operating system and the computer program in the non-volatile storage medium. The database of the computer device is used for storing data, such as an associated meteorological data set, heat wave feature parameters, multi-source data, a heat wave risk map, current station building information, an optimization algorithm, information of alternative station building positions, on-site survey information, information of position where a station is to be built, or the like. The network interface of the computer device is configured to be communicated with an external terminal through a network connection. When executed by the processor, the computer program can implement the method for siting heat wave monitoring stations based on risk evaluation.

In an embodiment, there is provided a computer device including a memory, a processor and a computer program stored in the memory and executable on the processor, wherein the processor implements the following steps when executing the computer program:
S10: acquiring historical meteorological data of a target region, and preprocessing the historical meteorological data according to spatial distribution and a time sequence to generate a gridded associated meteorological data set;
S20: identifying historical high-temperature heat wave events based on the associated meteorological data set, and calculating heat wave feature parameters and summary indexes thereof of grids based on occurrence times and daily heat wave magnitudes of the historical high-temperature heat wave events;
S30: evaluating a priority of building a heat wave monitoring station in each of the grids based on spatial distribution of the summary indexes of heat wave features in the target region;
S40: acquiring multi-source data of each of the grids in the target region, and evaluating a heat wave risk of each of the grids to generate a heat wave risk map;
S50: performing iterative computation using an optimization algorithm based on current station building information, temporal-spatial distribution features of meteorological factors and the heat wave risk map, so as to determine information of alternative station building positions; and
S60: acquiring on-site survey information of each alternative station building position, and determining information of a position where a station is to be built.

In an embodiment, there is provided a computer-readable storage medium having a computer program stored thereon, the computer program, when executed by a processor, implementing the above-mentioned steps S10 to S60.

It will be understood by those skilled in the art that all or part of the processes of the method according to the embodiments described above may be implemented by a computer program instructing related hardware, the computer program may be stored in a non-volatile computer-readable storage medium, and when executed, the computer program may include the processes of the method according to the embodiments described above. It should be clear to those skilled in the art that, for convenience and simplicity of description, the foregoing division of the functional units and modules is only used for illustration, and in practical applications, the above function distribution may be performed by different functional units and modules as needed;

that is, the internal structure of the apparatus may be divided into different functional units or modules to perform all or part of the above described functions.

The above embodiments are only used to illustrate the technical solutions of the present application, not to limit the present application; although the present application is described in detail with reference to the above embodiments, those having ordinary skill in the art should understand that they still can modify technical solutions recited in the aforesaid embodiments or equivalently replace partial features therein; these modifications or substitutions do not make essence of corresponding technical solutions depart from the spirit and scope of technical solutions of embodiments of the present application and should all be included within the protection scope of the present application.

What is claimed is:

1. A computer device, comprising a memory, a processor and a computer program stored in the memory and executable on the processor, wherein, the processor is configured to execute the computer program to implement a method for siting heat wave monitoring stations based on risk evaluation, comprising:
  acquiring historical meteorological data of a target region, and preprocessing the historical meteorological data according to a spatial distribution and a time sequence to generate a gridded associated meteorological data set;
  identifying historical high-temperature heat wave events based on the gridded associated meteorological data set, and calculating parameters and summary indexes of heat wave features for each of grids based on occurrence times and daily heat wave magnitudes of the historical high-temperature heat wave events;
  evaluating a priority of building a heat wave monitoring station in each of the grids based on spatial distribution features of the summary indexes of heat wave features in the target region;
  acquiring multi-source data of each of the grids in the target region, and evaluating a heat wave risk of each of the grids to generate a heat wave risk map;
  performing an iterative computation with an optimization algorithm based on current station building information, temporal-spatial distribution features of meteorological factors and the heat wave risk map, to determine information of alternative station building positions; and
  acquiring on-site survey information of each of the alternative station building positions, and determining information of a position where a station is to be built;
  wherein the acquiring historical meteorological data of a target region, and preprocessing the historical meteorological data according to a spatial distribution and a time sequence to generate a gridded associated meteorological data set comprises:
    acquiring gridded historical meteorological data of the target region, wherein, meteorological factors of the gridded historical meteorological data comprise an air temperature, a relative humidity and an average wind speed, and the gridded historical meteorological data comprises a plurality of authoritative meteorological data sets;
    preprocessing the gridded historical meteorological data according to the spatial distribution and the time sequence, wherein the preprocessing comprises data format conversion, abnormal value elimination and missing value filling; and
    acquiring a daily highest temperature of each of the grids in the target region, and humidity data and wind speed data corresponding to the daily highest temperature from the gridded historical meteorological data to generate the gridded associated meteorological data set;
  wherein the identifying historical high-temperature heat wave events based on the gridded associated meteorological data set, and calculating parameters and summary indexes of heat wave features for each of grids based on occurrence times and daily heat wave magnitudes of the historical high-temperature heat wave events comprises:
    determining a daily high-temperature data set $A_d = U_{y_s}^{y_e} U_{i=d-15}^{d+15} T_{y,j}$ of each of the grids based on the gridded associated meteorological data set, defining an N-th percentile in the daily high-temperature data set $A_d$ as a high-temperature threshold, defining a day with a daily highest temperature greater than the high-temperature threshold as a high-temperature day, and defining three continuous high-temperature days as a high-temperature heat wave event;
    calculating a sensible temperature $AT_d = 1.07T_d + 0.2e - 0.65V - 2.7$ of each of the grids based on the gridded associated meteorological data set, wherein $$e = \frac{RH}{100} \times 6.105 \times \exp\frac{17.27T}{237.7 + T};$$

calculating a daily heat wave magnitude $M_d$ of each of the grids based on the gridded associated meteorological data set and the sensible temperature $AT_d$, wherein $$M_d = \begin{cases} \dfrac{T_d - T_{y25p}}{T_{y75p} - T_{y25p}}, & \text{if } T_d > T_{y25p} \text{ and } T_d \geq AT_d \\ \dfrac{AT_d - T_{y25p}}{T_{y75p} - T_{y25p}}, & \text{if } T_d > T_{y25p} \text{ and } T_d < AT_d \\ 0, & \text{if } T_d \leq T_{y25p} \end{cases};$$

calculating an average heat wave magnitude, a heat wave days and a heat wave frequency corresponding to each of the grids based on the occurrence time and the daily heat wave magnitude of the high-temperature heat wave event of each of the grids in a reference period, to generate the parameters of the heat wave features;
  wherein, $U_{y_s}^{y_e}$ is a set of daily highest temperature data in the reference period of years ys to ye, d is a selected target date, $U_{i=d-15}^{d+15}$ is a set of daily highest temperature data in a window period of 15 days before and after the selected target date d, and $T_{y,j}$ is a daily highest temperature of a j-th day of a year y; $T_d$ is a daily highest temperature of the selected target date d, $AT_d$ is a highest sensible temperature of the selected target date d, e is a water vapor pressure, V is wind speed, RH is relative humidity, $T_{y25p}$ and $T_{y75p}$ are respectively a 25-th percentile and a 75-th percentile of annual highest temperatures of the years ys to ye; the average heat wave magnitude is an average value of daily heat wave magnitudes $M_d$ in one statistical period, the heat wave days is a number of days of the historical high-temperature heat wave events in one statistical period, and the heat wave frequency is a number of the historical high-temperature heat wave events in one statistical period;

wherein, after the calculating an average heat wave magnitude, a heat wave days and a heat wave frequency corresponding to each of the grids based on the occurrence time and the daily heat wave magnitude of the high-temperature heat wave event of each of the grids in a reference period, to generate the parameters of the heat wave features, the method further comprises:

preprocessing the parameters of the heat wave features according to the spatial distribution and the time sequence to generate a heat wave feature data set, and performing whitening preprocessing on the heat wave feature data set;

obtaining a trend degree of the heat wave frequency with a Mann-Kendall test method and a Sen slope estimation method;

performing an abrupt change detection on the heat wave features with the Mann-Kendall test method and a sliding T test method, to determine an abrupt change point and a corresponding abrupt change time point; and taking a subsequence after the abrupt change time point as a stable phase, and averaging average heat wave magnitudes and the heat wave days in the stable phase to obtain an annual average heat wave magnitude and an annual average heat wave days of each of the grids in the stable phase respectively;

wherein the evaluating a priority of building a heat wave monitoring station in each of the grids based on spatial distribution features of the summary indexes of heat wave features in the target region comprises:

creating a heat wave intensity map, a heat wave days map and a heat wave frequency trend degree map based on the spatial distribution features of the summary indexes of the heat wave features in the heat wave feature data set after the abrupt change time point in the target region;

determining an annual average heat wave magnitude grade, an annual average heat wave days grade and a heat wave frequency trend degree grade of each of the grids with a natural breakpoint method based on the heat wave intensity map, the heat wave days map and the heat wave frequency trend degree map;

setting a weight for each of the annual average heat wave magnitude, the annual average heat wave days and the trend degree of the heat wave frequency respectively, wherein the weight of the annual average heat wave days>the weight of the annual average heat wave magnitude>the weight of the trend degree of the heat wave frequency; and calculating a station building priority of each of the grids based on the annual average heat wave magnitude grade, the annual average heat wave days grade, the heat wave frequency trend degree grade as well as the weights of the annual average heat wave magnitude, the annual average heat wave days and the trend degree of the heat wave frequency of each of the grids, to generate a building priority map;

wherein the acquiring multi-source data of each of the grids in the target region, and evaluating a heat wave risk of each of the grids to generate a heat wave risk map comprises:

acquiring the multi-source data of each of the grids, and performing format conversion, the abnormal value elimination and the missing value filling on the multi-source data;

based on the building priority map, analyzing a probability, intensity and duration of the high-temperature heat wave event of each of the grids to evaluate a harmfulness index of the high-temperature heat wave event of each of the grids;

analyzing population and land utilization data of each of the grids based on the multi-source data to evaluate an exposure index for an influence of the high-temperature heat wave event;

analyzing population data, resource data, environmental data and economic development data of each of the grids based on the multi-source data to evaluate a vulnerability index for the influence of the high-temperature heat wave event; and performing weighted average calculation based on the harmfulness index, the exposure index and the vulnerability index of each of the grids to generate a heat wave risk grade of each of the grids, to create the heat wave risk map;

wherein the heat wave risk grade comprises a high risk, a medium risk and a low risk, and the performing an iterative computation with an optimization algorithm based on current station building information, temporal-spatial distribution features of meteorological factors and the heat wave risk map, to determine information of alternative station building positions comprises:

acquiring the current station building information, and determining position information and service range information of an initial monitoring station;

determining a service radius of a heat wave monitoring station to be built in the target region based on a semivariable function fitting result of different meteorological factors;

setting objective functions: max $U_{i=1}^{n}A_i$ and min $(n_H+n_M+n_L)$, and constraint functions: $D_{ij} \leq D_{max}$, $\Sigma_n A_{H\_i} \geq 0.95 A_H$, $n_H:n_M \geq 3$ and $n_H:n_L \geq 3$; and based on the optimization algorithm, performing iteration to obtain an approximate optimal solution, and determining the information of alternative station building positions;

wherein $A_i$ is a service area of an i-th station; $n_H$, $n_M$ and $n_L$ are numbers of heat wave monitoring stations to be built at the high risk, the medium risk and the low risk respectively, $D_{ij}$ is a distance between the i-th station and a j-th station, $D_{max}$ is the service radius of the heat wave monitoring station to be built, $A_{H\_i}$ is an area of a high risk region covered by the i-th station, and $A_H$ is a total area of high risk regions in the target region;

wherein the performing whitening preprocessing on the heat wave feature data set comprises performing whitening preprocessing on the heat wave feature data set such that autocorrelation of the heat wave feature data set is eliminated, influence of the data autocorrelation on data analysis is reduced, and accuracy of subsequent trend analysis of the heat wave feature parameters is increased.

2. The computer device according to claim 1, wherein, the summary indexes of the heat wave features for each of the grids in the reference period comprises the annual average heat wave magnitude, the annual average heat wave days and the trend degree of the heat wave frequency corresponding to each of the grids; a trend analysis and an abrupt change point test are performed on the time sequence of the heat wave frequency in the reference period to obtain the trend degree of the heat wave frequency and the abrupt change time point, the subsequence after the abrupt change time point is defined as the stable phase, and the average heat wave magnitudes and the heat wave days in the stable phase are averaged with a natural year as a statistical period to obtain the annual average heat wave magnitude and the annual average heat wave days respectively.

* * * * *